United States Patent
Ohsono et al.

(10) Patent No.: US 7,215,728 B2
(45) Date of Patent: May 8, 2007

(54) SPENT FUEL HOUSING SQUARE PIPE, BASKET AND SPENT FUEL HOUSING CONTAINER

(75) Inventors: Katsunari Ohsono, Hyogo (JP); Toshihiro Matsuoka, Hyogo (JP); Shinji Ookame, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 11/327,424

(22) Filed: Jan. 9, 2006

(65) Prior Publication Data
US 2006/0109945 A1 May 25, 2006

Related U.S. Application Data

(62) Division of application No. 10/873,312, filed on Jun. 23, 2004, now abandoned, which is a division of application No. 10/106,384, filed on Mar. 27, 2002, now Pat. No. 6,778,625.

(30) Foreign Application Priority Data
Mar. 29, 2001 (JP) ............................. 2001-097584

(51) Int. Cl.
*G21C 19/00* (2006.01)
(52) U.S. Cl. ...................... 376/272; 376/438; 376/462; 250/506.1; 250/507.1
(58) Field of Classification Search ................ 376/272, 376/438, 462; 250/506.1, 506.2, 507.1; 220/4.04
See application file for complete search history.

(56) References Cited

U.S. PATENT DOCUMENTS

| 4,034,227 A |  | 7/1977 | Soot |
| 4,319,960 A |  | 3/1982 | Larson et al. |
| RE31,661 E |  | 9/1984 | Mollon |
| 4,488,048 A |  | 12/1984 | Bienek et al. ........... 250/506.1 |
| 4,695,424 A | * | 9/1987 | Flynn ......................... 376/272 |
| 4,711,758 A | * | 12/1987 | Machado et al. ........... 376/272 |
| 4,746,487 A |  | 5/1988 | Wachter |
| 4,770,844 A | * | 9/1988 | Davis, Jr. ................... 376/272 |

(Continued)

FOREIGN PATENT DOCUMENTS

JP 62-242725 10/1987

(Continued)

OTHER PUBLICATIONS

Kunio Maruoka, "Spent-Fuel Storage Container", Nuclear Viewpoints, vol. 44/No. 4, Apr. 1998, pp. 8-39 (with partial English translation).

(Continued)

*Primary Examiner*—Ricardo J. Palabrica
(74) *Attorney, Agent, or Firm*—Oblon, Spivak, McClelland, Maier & Neustadt, P.C.

(57) ABSTRACT

Corner of each square pipe is molded into a terrace shape having steps. When a basket is constructed by these square pipes, steps of adjoining square pipes are assembled together face to face. Fuel rod aggregates are housed inside the square pipes and in a cells formed between the square pipes. Since the adjoining square pipes are assembled in a staggered arrangement, boundaries of the cells are defined by the walls of the square pipes itself.

7 Claims, 24 Drawing Sheets

U.S. PATENT DOCUMENTS

| | | | |
|---|---|---|---|
| 4,827,139 A * | 5/1989 | Wells et al. | 250/507.1 |
| 5,384,813 A | 1/1995 | Loftis et al. | |
| 5,651,038 A | 7/1997 | Chechelnitsky et al. | |
| 6,061,414 A | 5/2000 | Kopecky et al. | |
| 6,409,440 B1 | 6/2002 | Souchet et al. | |
| 6,726,741 B2 * | 4/2004 | Murakami et al. | 75/252 |
| 2003/0174801 A1 | 9/2003 | Costas De La Pena, et al. | |

FOREIGN PATENT DOCUMENTS

| | | |
|---|---|---|
| JP | 6-146845 | 5/1994 |
| JP | 2001-74884 | 3/2001 |

OTHER PUBLICATIONS

Webster's New Internationl Dictionary of the English Language. Second Ed., 1950, p. 2606.

* cited by examiner

BASKET 202

NOT LESS THAN L/2

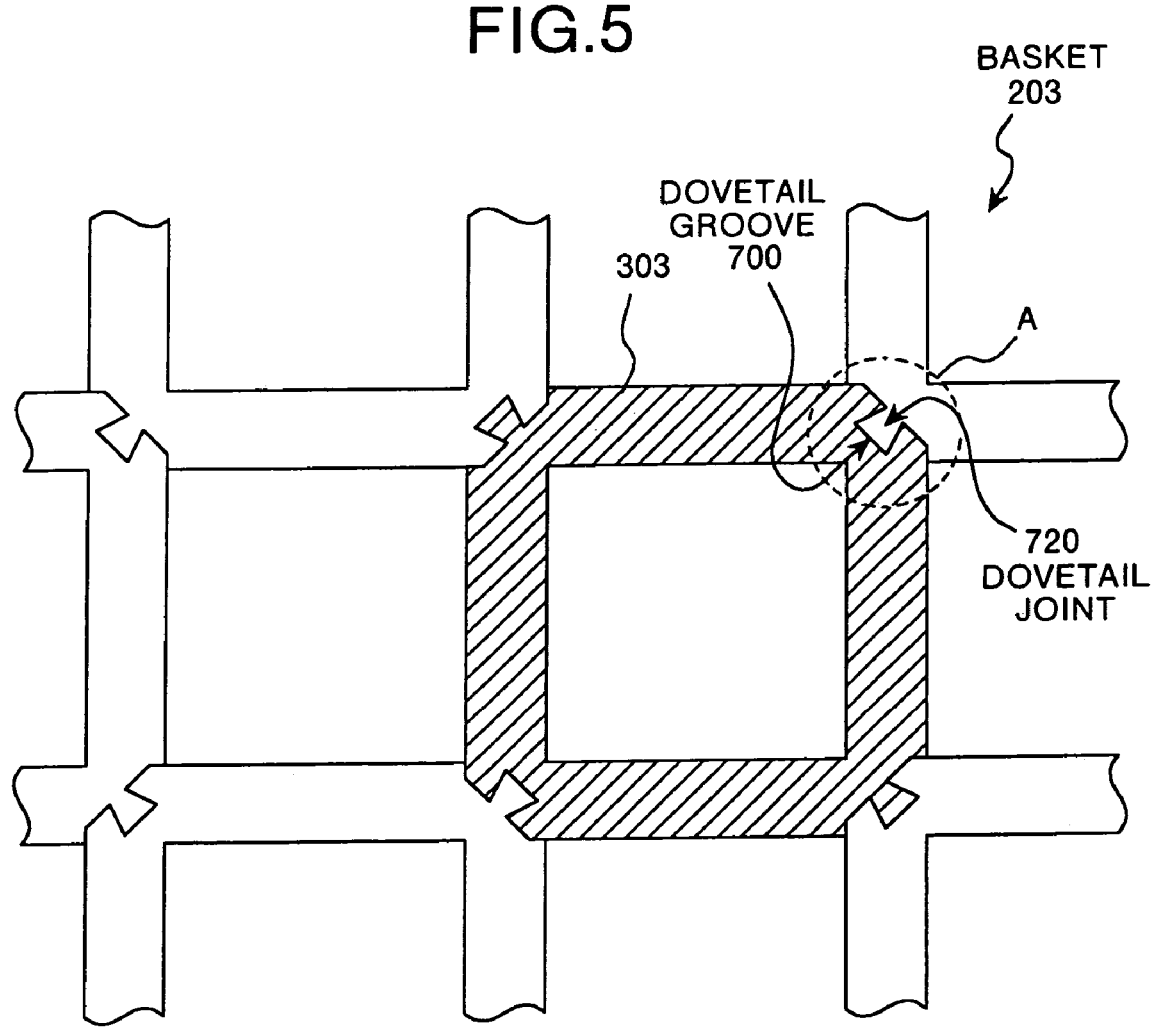

SPENT FUEL HOUSING SQUARE PIPE, BASKET AND SPENT FUEL HOUSING CONTAINER

FIELD OF THE INVENTION

The present invention relates to a square pipe, a basket and a spent fuel container which stores spent fuel aggregates.

BACKGROUND OF THE INVENTION

A nuclear fuel aggregate, which has been burnt and is no longer used in its terminal point of a nuclear fuel cycle, is referred to as a spent fuel aggregate. The spent fuel aggregate, which contains high radioactive substances such as FP, needs to be thermally cooled off so that it is cooled off for a predetermined period (for three to six months) in a cooling pit in a nuclear power plant. Thereafter, this is housed in a cask that is a shielding container, and transported by a truck or a ship to a recycling facility where it is stored. Upon housing the spent fuel aggregates in the cask, a holding frame having a lattice shape in its cross-section, called a basket, is used. The spent fuel aggregates are inserted into cells that are a plurality of housing spaces formed in the basket, one by one, thus, it is possible to ensure an appropriate holding strength against vibration, etc. during the transportation.

With respect to conventional examples of such a cask, various types thereof have been proposed in "Atomic eye" (issued on Apr. 1, 1998, Nikkan Kogyo Publishing Production) and Japanese Patent Application Laid-Open No. 62-242725. The following description will discuss a cask that forms a premise upon developing the present invention. However, the cask is shown for convenience of explanation, and is not necessarily related to the conventionally known and used device.

FIG. 23 is a perspective view that shows one example of a cask. FIG. 24 is a cross-sectional view in the radial direction of the cask shown in FIG. 23. A cask 500 is constituted by a cylinder-shaped trunk main body 501, a resin portion 502 placed on the outer circumference of the trunk main body 501, an outer cylinder 503, a bottom 504 and a lid section 505. The trunk main body 501 and the bottom 504 are forged products of carbon steel that is a γ ray-shielding substance. Moreover, the lid section 505 is constituted by a primary lid 506 and a secondary lid 507 made of stainless steel. The trunk main body 501 and the bottom 504 are joined to each other through butt welding.

The primary lid 506 and the secondary lid 507 are secured to the trunk main body 501 with stainless bolts. A hollow O-ring made of metal to which an aluminum coating, etc. is applied is interpolated between the lid section 505 and the trunk main body 501 so as to maintain the inside thereof in an air-tight state. Trunnions 513 which suspends the cask 500 are placed on both of the sides of a cask main body 512 (one of them is not shown). Moreover, buffer members 514 in which timber, etc. is sealed as a buffer member are attached to both of the ends of the cask main body 512 (one of them is not shown).

A plurality of inner fins 508 which allows heat conduction are placed between the trunk main body 501 and the outer cylinder 503. The inner fins 508 are made of copper as their material in order to increase the efficiency of heat conductivity. Resin 502 is injected into a space formed by the inner fins 508 in a fluid state, and solidified and formed through a thermo-curing reaction, etc. A basket 509 has a construction formed by collecting 69 square pipes 510 into a bundle as shown in FIG. 23, and is inserted into a cavity 511 of the trunk main body 501 in a fixed state. The square pipe 510 is made of an aluminum alloy in which neutron-absorbing member (boron, B) is mixed so as to prevent the inserted spent fuel aggregate from reaching the criticality. Moreover, each housing space formed by each square pipe 510 is referred to as a cell 515, and each cell 515 can house one spent fuel aggregate. Trunnions 513 which suspends the cask 500 are placed on both of the sides of the cask main body 512 (one of them is not shown). Moreover, buffer members 514 in which timber, etc. is sealed as a buffer member are attached to both of the ends of the cask main body 512 (one of them is not shown).

A basket that has been used for a conventional radioactive substance storing container such as a cask and a canister is constituted by combining side faces of a plurality of square pipes with each other, therefore, in order to ensure a sufficient strength at the time of falling down, it is necessary to increase the plate thickness of the square pipe. For example, when a cask horizontally falls down, the load of the spent fuel aggregate is concentrated on the face end portions of each square pipe, thus, it is necessary to provide a thickness that can withstand this impact force. Moreover, since the basket needs to have a function to prevent the inserted spent fuel aggregate from reaching the criticality, the square pipe used for the basket is made of an aluminum alloy in which boron (B) is mixed as a neutron absorbing material. In order to provide this criticality preventive function, the square pipe for the basket needs to have a certain degree of thickness. For this reason, the outer shape dimension of the entire basket tends to become large, resulting in a greater mass in the entire basket.

Moreover, in order to protect the cask main body from an accident such as falling down during transportation of the cask, the buffer members 514 (one of which is omitted from the Figure) are attached to both of the ends of the cask (see FIG. 23). The impact at the time of falling of the cask is buffered with the buffer members 514 being crushed. In this case, the margin of crushing in the radial direction, which is used for buffering the impact at the time of horizontal falling down, is ensured by increasing the diameter of the buffer members 514, however, when land transportation is taken into consideration, the diameter of the buffer member 514 can not be increased unduly. When the outer diameter of the cask main body is reduced, the resulting space can be used as the margin of crushing in the buffer member 514, thereby making it possible to reduce the outer diameter of the buffer member 514.

SUMMARY OF THE INVENTION

It is an object of this invention to achieve at least one of the following points, to provide a basket which is constituted by pipes having a thickness thinner than conventional pipes and consequently to reduce the diameter of the spent nuclear fuel storing container, to provide a basket and square pipes used for storing spent fuel that are easily assembled with reduced offsets of the square pipes constituting the basket, and to provide square pipes used for storing spent fuel and a basket which can alleviate a stress concentration on a specific portion of the square pipe so as to reduce degradation in performances.

The spent fuel housing square pipe according to one aspect of the present invention comprises a plurality of square pipes assembled in a staggered arrangement. A spent fuel aggregate is housed inside the square pipes and in a space defined by walls of the square pipes. The corners of walls of each square pipe is formed into a terrace shape having a plurality of steps. When assembling the square pipes the steps of the terrace shape of adjacent square pipes are butted against each other.

These square pipes constitute a basket with a plurality of them being combined with each other in a staggered arrangement, therefore, in comparison with a basket constituted by allowing the side faces of square pipes to contact each other, it is possible to make the thickness of the side face of the square pipe thinner. This is because, if the plate thickness of the square pipe side face is equal to the size corresponding to two sheets of the conventional plate, the rigidity would virtually double the conventional rigidity. Therefore, if the plate thickness is equal to the size corresponding to two sheets of the conventional plate, it becomes possible to withstand a greater impact accordingly. Moreover, the corner portion is formed into a terrace shape, and the pipes are combined with each other by getting the step faces butted against each other, therefore, it is possible to prevent offsets in a direction perpendicular to the axis direction.

Also, the spent fuel housing square pipe has its corner portion formed into a terrace shape, therefore, strictly speaking, this is not defined as a square pipe. However, since the cross-sectional shape of this pipe perpendicular to the pipe axial direction has a square shape, and the outer shape has virtually a square shape as a whole, in the present invention, this pipe is included in the concept of square pipes. Moreover, the expression "square pipes are combined with each other in the staggered arrangement" means that "square pipes are diagonally combined with each other", and, for example, this arrangement is shown in FIG. 1. The same is also true of the following description.

The square pipes according to the present invention are used not only as a basket in which they are combined in the staggered arrangement so as to be inserted in a radioactive substance storing container such as a cask and a canister but also as a lack in a spent fuel storing pool which stores spent fuel for a predetermined period of time. In this case, the square pipes according to the present invention as they are can be used as a lack, however, it is more preferable to combine the square pipes of the present invention and use in the form of a basket. With this arrangement, after having been stored for a predetermined period of time, a plurality of spent fuel aggregates, stored in the basket, as they are, are replaced into a cask or a canister, and transported and stored so that it is possible to eliminate time-consuming tasks to replace the spent fuel aggregates into a cask, and so on one by one. The same is also true in the other aspects of the present invention.

The spent fuel housing square pipe according to another aspect of the present invention comprises a plurality of square pipes assembled in a staggered arrangement. A spent fuel aggregate is housed inside the square pipes and in a space defined by walls of the square pipes. A connecting section which assembles with a connecting section of a square pipe diagonally adjacent thereto, is formed on each of the four corners of the square pipe, and the connecting sections of diagonally adjacent square pipes is are engaged with each other.

These spent fuel housing square pipes are connected to each other in a manner so as to be engaged with a connecting section of a square pipe diagonally adjacent thereto, therefore, even when the square pipes are combined with each other, these are less susceptible to disengagement, and the basket can be easily combined. Moreover, if there should be an accidental fall, it is possible to maintain the shape of the basket more firmly. With respect to the engaging construction, in addition to the construction shown in FIG. 11, a construction using dovetail grooves and dovetail joints may be adopted.

The spent fuel housing square pipe according to still another aspect of the present invention comprises a plurality of square pipes assembled in a staggered arrangement. A spent fuel aggregate is housed inside the square pipes and in a space defined by walls of the square pipes. Corners of walls of each square pipe is formed into a terrace shape having a plurality of steps and when assembling the square pipes the steps of the terrace shape of adjacent square pipes are butted against each other. A flux trap structure, which fits to the shape of the terrace portion, is formed inside of the square pipe is at least the wall or the terrace portion of the square pipe.

In this spent fuel housing square pipe, the flux trap placed in the inside of the square pipe is allowed to have a cross-sectional shape perpendicular to the axis direction that is formed to fit to the cross-sectional shape of the corner portion having a terrace shape perpendicular to the axis direction. Consequently, the flux trap placed inside of the side face can be widened to the vicinity of the corner portion. Moreover, the flux trap placed inside of the side face makes the thickness to the outer wall virtually equal, thereby making it possible to alleviate the influence of stress concentration. At least one of the cross-sectional shapes perpendicular to the axis direction of the flux traps formed on the side face and the terrace portion of the square pipe may be formed to fit to the cross-sectional shape perpendicular to the axis direction of the corner portion having a terrace shape.

The basket according to still another aspect of the present invention comprises a square pipe assembly having plurality of square pipes assembled in a staggered arrangement, a spent fuel housing container, such as a cask or a canister, or a spent fuel storing pool, that houses the square pipe assembly. A spent fuel aggregate is housed inside the square pipes and in a space defined by walls of the square pipes.

Since this basket is constituted by combining a plurality of square pipes in a staggered arrangement, it is possible to make the thickness of the side face of the square pipe thinner than the basket that is constituted by making the side faces of the square pipes contact with each other. This is because, if the plate thickness of the square pipe side face is equal to the size corresponding to two sheets of the conventional plate, the rigidity would virtually double the conventional rigidity. Therefore, it is possible to make the outer diameter of the basket smaller, and in the case of the same outer diameter, it is possible to increase the number of spent fuel aggregates to be housed. Moreover, when this arrangement is applied to the housing rack in a spent fuel storing pool, etc., it is possible to house the spent fuel aggregates more closely, and also to lighten the system as compared with the boron-stainless product, thus, it becomes possible to reduce the load to be imposed on the structure supporting the rack at the time of any abnormal state.

The basket according to still another aspect of the present invention comprises a square pipe assembly having the square pipes disclosed above and assembled in a staggered arrangement so that spaces inside the square pipes and spaces surrounded by the side faces of the square pipes are formed into lattice-shaped cells with used fuel aggregates being housed in the cells, a spent fuel housing container, such as a cask or a canister, or a spent fuel storing pool, that houses the square pipe assembly. A spent fuel aggregate is housed inside the square pipes and in a space defined by walls of the square pipes.

This basket is constituted by combining square pipes each having a corner portion formed into, for example, a terrace shape, therefore, in addition to the functions obtained by the above-mentioned basket, offsets in the direction perpendicular to the axis direction can be regulated. Therefore, the basket is more easily combined, and if there should be an accidental fall, it is possible to maintain the shape of the basket more firmly.

The basket according to still another aspect of the present invention comprises a square pipe assembly having a plurality of square pipes assembled in a staggered arrangement, wherein corners of walls of each square pipe is formed into a terrace shape having a plurality of steps, and when assembling the square pipes the steps of the terrace shape of adjacent square pipes are butted against each other, a spent fuel housing container, such as a cask or a canister, or a spent fuel storing pool, that houses the square pipe assembly, wherein a spent fuel aggregate is housed inside the square pipes and in a space defined by walls of the square pipes, and a square pipe receiver placed between adjacent square pipes located on the outermost circumference of the square pipe assembly.

In this basket, a square pipe receiver is placed between adjacent square pipes located on the outer most circumference of square pipes constituting the basket. This square pipe receiver allows decay heat from the fuel rod aggregates inserted into cells located on the basket outermost circumference to conduct to the cask outer portion efficiently. Moreover, the impact at the time of horizontal falling of the cask is supported by this square pipe receiver, thereby making it possible to prevent collapse of the basket at the time of falling of the cask.

The basket according to still another aspect of the present invention comprises a square pipe assembly having a plurality of square pipes assembled in a staggered arrangement, a spent fuel housing container, such as a cask or a canister, or a spent fuel storing pool, that houses the square pipe assembly, wherein a spent fuel aggregate is housed inside the square pipes and in a space defined by walls of the square pipes, and a fastener which fastens the outermost square pipes of the square pipe assembly and a spacer block formed to fit to the inner shape of the spent fuel housing container or the spent fuel storing pool. In this basket, the square pipes and the spacer block are preliminarily secured by the fastening tool, such as bolts, therefore, since no machining process such machining to mount holes is required in the cavity of the canister or cask, no time-consuming tasks are required in the assembling operation.

In the spent fuel housing container according to still another aspect of the present invention, there is provided the wherein a basket, which is formed into a lattice shape as a whole by combining a plurality of square pipes with each other in a staggered arrangement, is inserted to a spent fuel housing container main body with its outer shape being fitted to the cavity inner shape of the spent fuel container main body so that a spent fuel aggregate is housed inside each of the cells in the basket.

This spent fuel housing container is provided with a basket that is formed into a lattice shape as a whole by combining a plurality of square pipes with each other in a staggered arrangement in its cavity, therefore, in comparison with the basket formed by allowing the side faces of the square pipes to contact each other, this arrangement makes the thickness of the side face of the square pipe thinner. This is because, if the plate thickness of the square pipe side face is equal to the size corresponding to two sheets of the conventional plate, the rigidity would virtually double the conventional rigidity. Therefore, since it is possible to reduce the outer diameter of the basket, it becomes possible to reduce the outer diameter of the spent fuel housing container as compared with the conventional basket. Consequently, it is possible to make the outer diameter of a buffer member to be attached to the spent fuel housing container smaller. Moreover, in the case of the same outer diameter of the spent fuel housing container, it is possible to increase the number of spent fuel aggregates to be housed.

Other objects and features of this invention will become apparent from the following description with reference to the accompanying drawings.

BRIEF DESCRIPTION OF THE DRAWINGS

FIG. 5 is a cross-sectional view in the diameter direction that shows a second modified example of a pipe according to the first embodiment of the present invention.

DETAILED DESCRIPTIONS

Embodiments of the present invention will be explained in detail below while referring to the accompanying drawings. However, the present invention is not intended to be limited by the following embodiments. Further, the constituent elements of the following embodiments may include those elements that can be easily arrived at by one skilled in the art.

Figure 1:
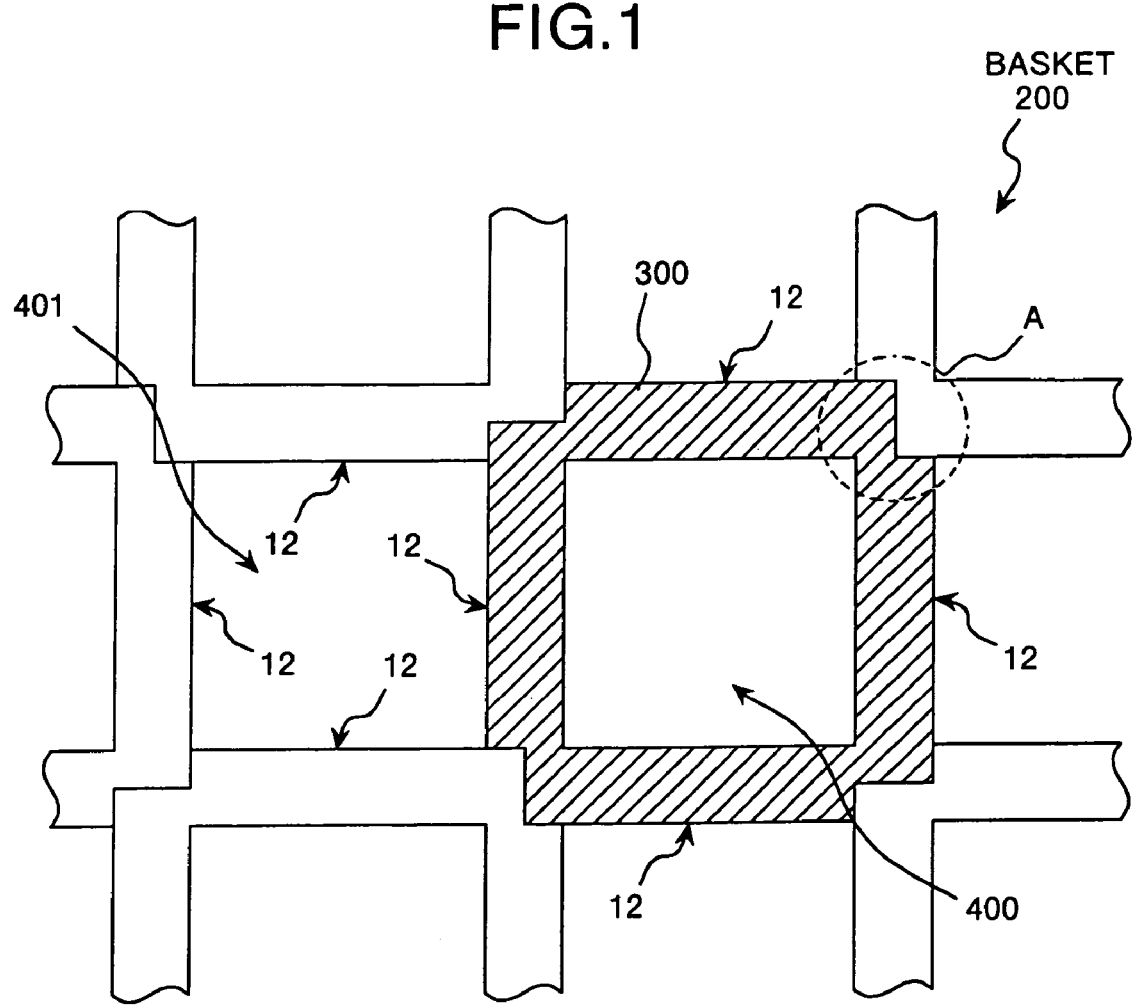
FIG. 1 is a cross-sectional view in the diameter direction that shows one portion of a basket formed by combining square pipes according to a first embodiment of the present invention.

FIG. 1 is a cross-sectional view in the diameter direction that shows one portion of a basket formed by combining square pipes according to a first embodiment of the present invention. In this Figure, an explanation will be especially given of a portion indicated by slanted lines. These square pipes constitute a basket used for housing spent fuel aggregates of a BWR (Boiling Water Reactor). As shown in FIG. 1, this square pipe 300 features that its corner portion (an area indicated by A in the Figure) is molded into a terrace shape. Further, when a basket 200 is constituted by these square pipes 300, the square pipes 300 are assembled with each other in a staggered arrangement with the terrace portions placed on the corner portions being combined with each other. Thus, the insides of the square pipes 300 and spaces surrounded by side faces 12 of the square pipes 300 in the four directions are allowed to form cells 400 and 401 which house fuel rod aggregates.

Figure 25:
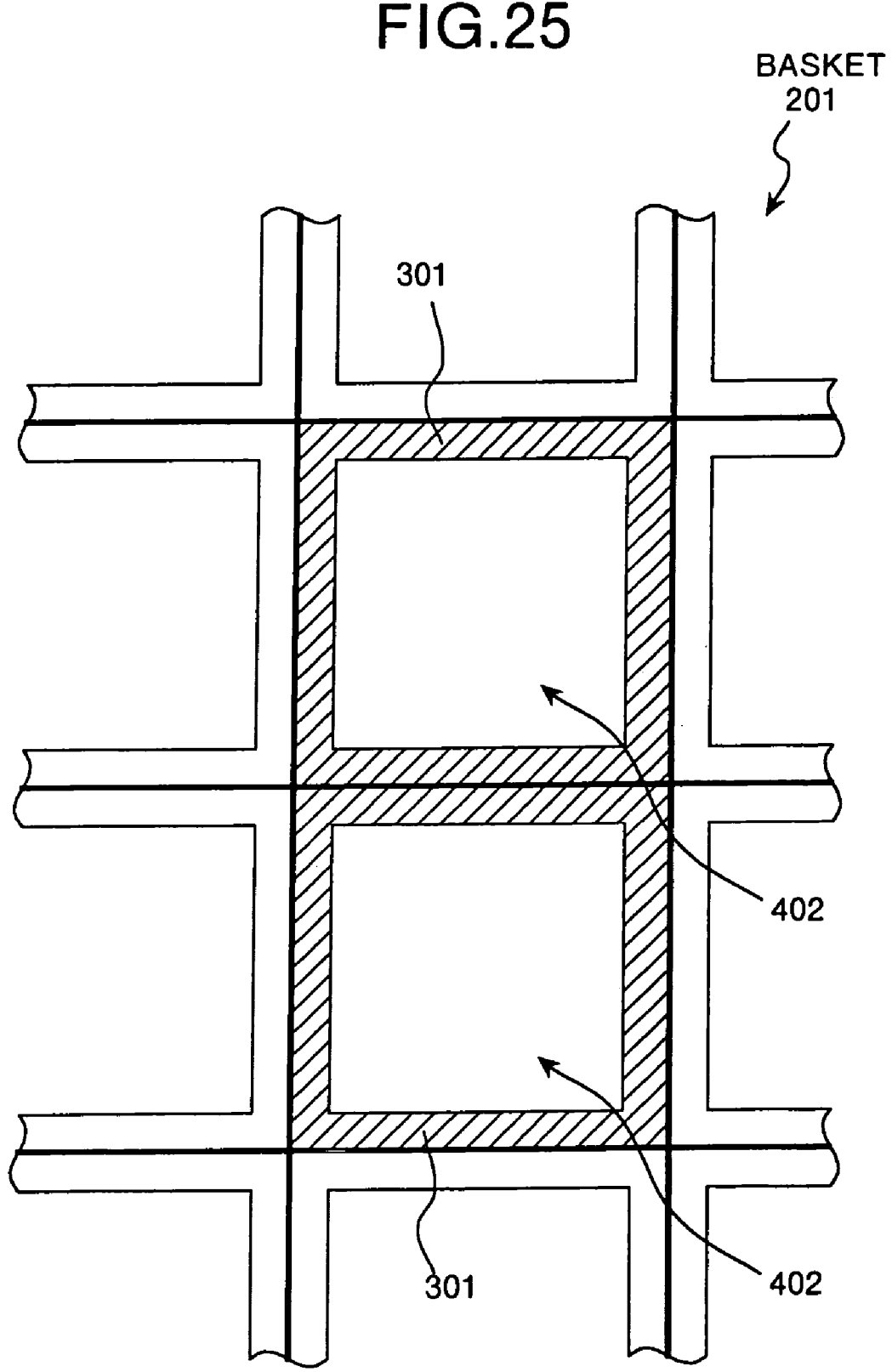
FIG. 25 is a cross-sectional view that shows one portion of a basket formed by combining conventional square pipes.

FIG. 25 is a cross-sectional view in the diameter direction that shows one portion of a basket 201 formed by assembling conventional square pipes. As shown in FIG. 25, conventionally, a plurality of square pipes 301 are used and combined with each other to constitute a basket 201 so that the border between cells 402 has a structure in which two sheets of plates are superposed on each other. In the basket 200 according to the first embodiment, a plurality of square pipes 300 are combined with each other in a staggered arrangement so that the border between a cell 400 and a cell 401 is formed by one sheet of plate. For this reason, if this border has a thickness that corresponds to two sheets of the conventional plate, the rigidity would become greater than the conventional rigidity, therefore, in the case of the same rigidity as the conventional one, it is possible to reduce the plate thickness of the square pipe 300 accordingly. Therefore, when the basket 200 is constituted by the square pipes 300 disclosed in the first embodiment, it is possible to reduce the outer diameter of the entire basket in comparison with the conventional construction in which square pipes 301 are arranged with the side faces being made in contact with each other, and it is possible to reduce the outer diameter of the cask correspondingly. Consequently, since the gross weight of the cask is made lighter than the conventional cask, it is possible to reduce the buffering capability required for the buffer member in comparison with the conventional buffer member.

Moreover, the outer diameter thus reduced makes it possible to increase the margin of crushing in the radial direction of the buffering member correspondingly, and consequently to reduce the outer diameter of the buffering member. In the case of the same outer diameter in the cask, it is possible to increase the number of spent fuel aggregates to be housed. Moreover, when this arrangement is applied to the housing rack in a spent fuel storing pool, etc., it is possible to house the spent fuel aggregates more closely, and also to lighten the system as compared with the boron-stainless product, thus, it becomes possible to reduce the load to be imposed on the structure supporting the rack at the time of any abnormal state.

Figure 2A:
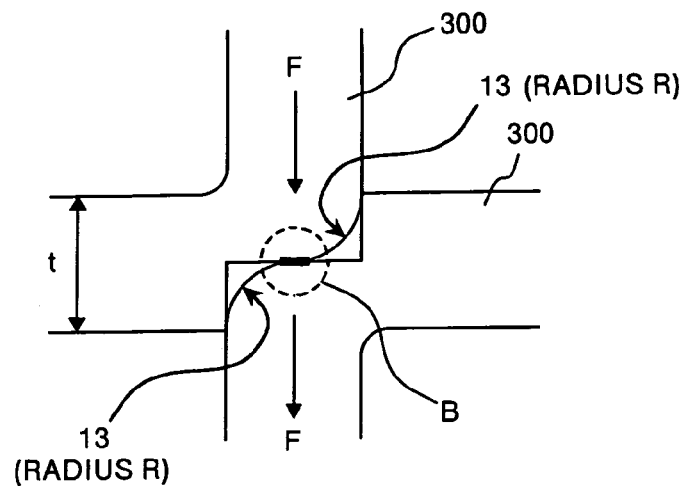
FIG. 2A and FIG. 2B are explanatory drawings showing how the stress is transmitted to the corner portion of each square pipe in the first embodiment of the present invention.
Figure 2B:
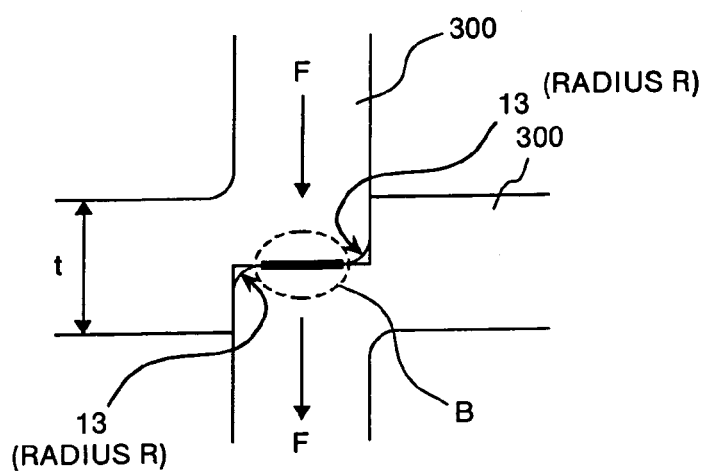

FIG. 2A and FIG. 2B are explanatory drawings showing how the stress is transmitted to the corner portion of each square pipe 300 in the first embodiment. As shown in FIG. 2A, when the radius R of an corner portion 13 of the corner portion of the square pipe 300 formed into a terrace shape is great, the face which receives a load F becomes small, resulting in a greater possibility of an excessive facial load. Moreover, the great radius R fails to ensure a sufficient thermal conductive area. Consequently, the square pipe 300 is susceptible to damages and other degradation in performances. Even in the case of a load diagonally applied thereon, this might cause degradation in performances in the square pipe 300 due to the stress concentration.

In order to avoid the above-mentioned problems, the corner portion 13 in the corner portion of the square pipe 300 formed into a terrace shape is preferably molded so as to have a sharp edge as shown in FIG. 2B. This arrangement gets the adjacent pipes butted against each other on virtually the entire portions of the step faces, therefore, it is possible to reduce the above-mentioned facial load, and also to obtain a sufficient heat conductive area. These functions make it possible to reduce degradation in the performances of the square pipe 300. An explanation will be given of the results of falling tests. First, since the dimension of the square pipe 300 was determined based upon the dimension of the spent fuel aggregates to be housed, evaluation was made based upon the radius R with respect to the plate thickness t of the square pipe 300. Table 1 shows the results of evaluation.

TABLE 1

| Radius R | Evaluation on stress concentration |
|---|---|
| 1.5t | bad |
| 1.0t | bad |
| 0.8t | bad |
| 0.6t | good |
| 0.4t | better |
| 0.2t | best |
| 0.1t | best |
| 0.05t | best |

As a result, when the radius R=0.8 t to 1.5 t, an unwanted stress concentration was exerted on a specific portion (an area indicated by B in FIG. 2A and FIG. 2B) of the square pipe 300. In the case of the radius. R=0.6 t, although the degree of the stress concentration was alleviated, it was still in an undesirable state. Next, in the case of the radius R=0.4 t, the stress concentration was alleviated in a certain degree, and maintained in a comparatively permissible range. In the case of the radius R=0.05 t to 0.2 t, the stress concentration was alleviated considerably to form a desirable state. In particular, in the case of R=0.1 t and 0.05 t, desirable results were obtained and the stress concentration was minimized to such a degree that no problem was raised.

Figure 3:
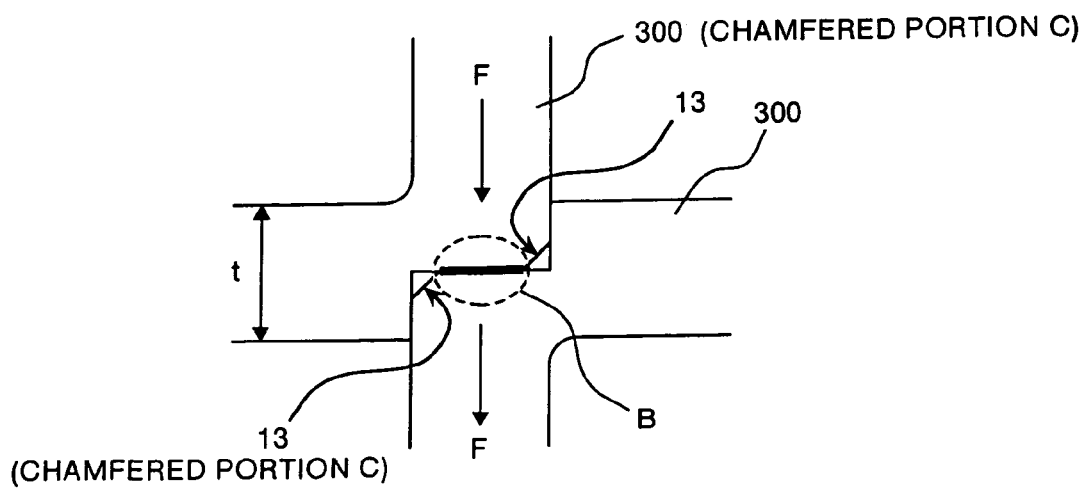
FIG. 3 is a cross-sectional view in the diameter direction that shows a modified example of the square pipe according to the first embodiment of the present invention.

Moreover, the sharp edge formed on the corner portion 13 of the square pipe 300 may have a chamfered shape. FIG. 3 is a cross-sectional view in the diameter direction that shows a modified example of the square pipe 300 according to the first embodiment of the present invention. The dimension of this chamfered portion C is preferably set to not more than 1.0 mm (dimension C=not more than 0.2 t) in the same manner as described above. Even in this case, when a load is applied to the basket in the direction of arrow F in the Figure, this arrangement gets the adjacent square pipes 300 butted against each other on virtually the entire portions of the step faces, therefore, it is possible to reduce the stress concentration on a specific portion of the square pipe 300. Moreover, since this arrangement also ensures a sufficient heat conductive area, it becomes possible to reduce degradation in the performances of the basket.

Since it is necessary for the basket to have a function to prevent the inserted spent fuel aggregate from reaching the criticality, the square pipe is made of an aluminum alloy to which boron (B) is mixed as a neutron-absorbing material. Natural boron includes $B^{10}$ that devotes to absorb neutron and $B^{11}$ that does not devote to absorb neutron. Therefore, when enriched boron $B^{10}$ having neutron-absorbing capability is used, it is possible to increase the neutron-absorbing capability to a degree corresponding to increased boron $B^{10}$, in comparison with the case in which natural boron, as it is, is used, supposing that the amount of addition of boron is the same. Therefore, the application of the enriched boron makes it possible to use a square pipe having a thinner plate thickness in comparison with the case in which natural boron, as it is, is used, supposing that the neutron-absorbing capability is the same. From this point of view, in an attempt to make the thickness of the square pipe of the first embodiment thinner than the size corresponding to two sheets of the plates of the conventional square pipe, it is preferable to use an aluminum material to which enriched boron is added. The same is true for the following embodiments.

Figure 4A:
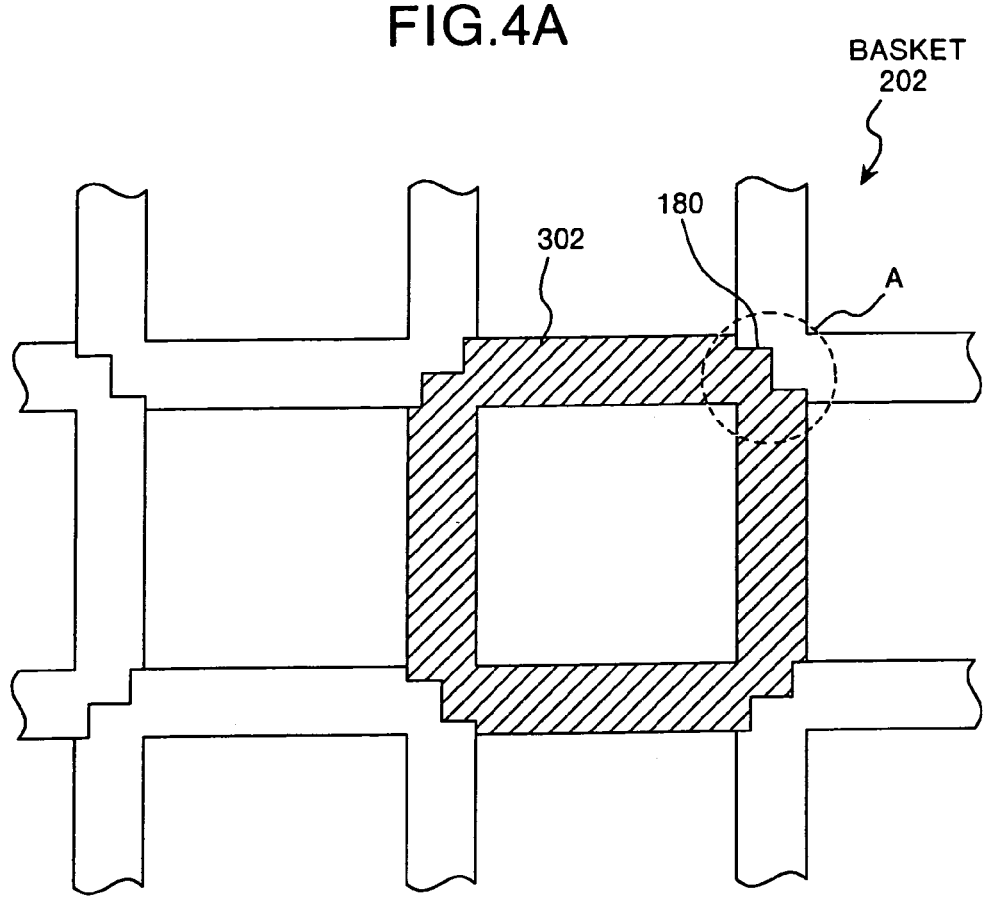
FIG. 4A to FIG. 4C are cross-sectional views in the diameter direction that shows a first modified example of a pipe according to the first embodiment of the present invention.
Figure 4B:
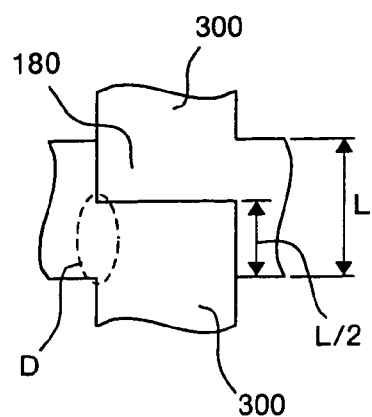
Figure 4C:
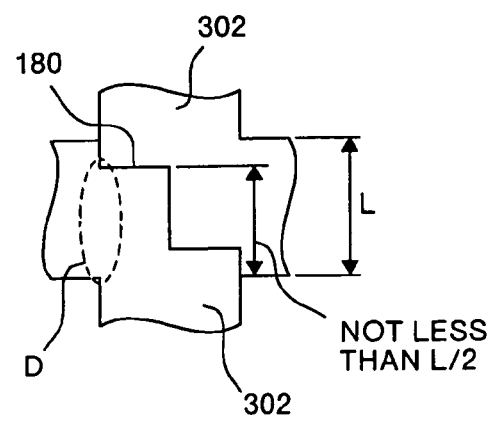

FIG. 4A to FIG. 4C are cross-sectional views in the diameter direction that shows a first modified example of a pipe according to the first embodiment of the present invention. In the above-mentioned square pipe, the corner portion (an area indicated by A in the FIG. 4A) has been molded into a terrace shape with one step, however, this pipe 302 features that the number of steps of the terrace shape is increased so that the corner portion of the pipe 302 is molded into a terrace shape with multiple steps. As shown in FIG. 4B, in the square pipe molded into a terrace shape with one step, the plate thickness of a portion on which a stress is concentrated (portion indicated by D in FIG. 4B) is reduced to one-half the thickness of the side face plate of the square pipe 300. However, as shown in FIG. 4C, in the case of a terrace shape with multiple steps, the plate thickness of a portion on which a stress is concentrated (portion indicated by D in FIG. 4C) is maintained to not less than one-half the thickness of the side face plate of the square pipe 302. For this reason, in comparison with the square pipe 300 having the corner portion molded into a terrace shape with one step, this construction makes it possible to provide higher rigidity and also to reduce the influence of stress concentration. Moreover, these square pipes are molded through a hot-cast extrusion method, and a molding process for a terrace shape with multiple steps makes the thickness of the entire square pipe more uniform, and provides an easier molding process.

Figure 12:
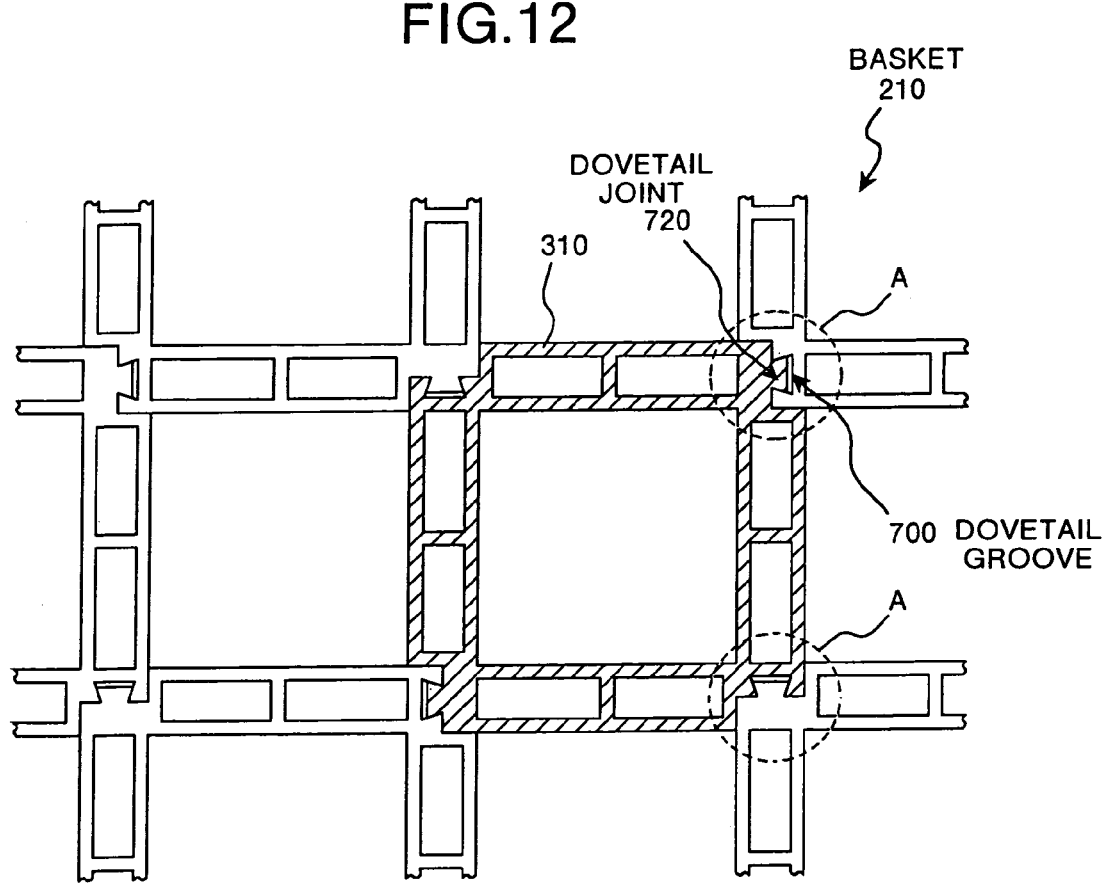
FIG. 12 is a cross-sectional view in the diameter direction that shows a sixth modified example of a square pipe according to the second embodiment of the present invention.

FIG. 5 is a cross-sectional view in the diameter direction that shows a second modified example of a pipe according to the first embodiment of the present invention. In the above-mentioned square pipe, the corner portion has been molded into a terrace shape, however, these pipes 303 feature that they are connected to each other by using a dovetail groove 700 and a dovetail joint 720 formed on the corner portions (areas indicated by A in the Figure) of the respective square pipes. Upon constructing a basket 203, the dovetail joint 720 formed on one of the pipes 303 is fitted to the dovetail groove 700 formed in the other square pipe 303 so that the square pipes 303 are combined with each other. In this manner, since the square pipes 303 are coupled to each other through the dovetail groove 700 and the dovetail joint 720 so that it is possible to prevent the joined square pipes 303 from coming off, and also to eliminate a positional offset between the square pipes 303. For this reason, the square pipes 303 according to this modified example can be easily assembled to the basket 203, and these are assembled into a cavity with the cask being placed longitudinally to form the basket 203. The square pipe 303 according to the second modified example is made for use in BWRs, however, for example, as shown in FIG. 12, a space which separates the outer wall and the inner wall may be placed inside the side portion of the pipe so as to form a flux strap, so as to store spent fuel aggregates for use in PWRs, which will be explained below.

Figure 6:
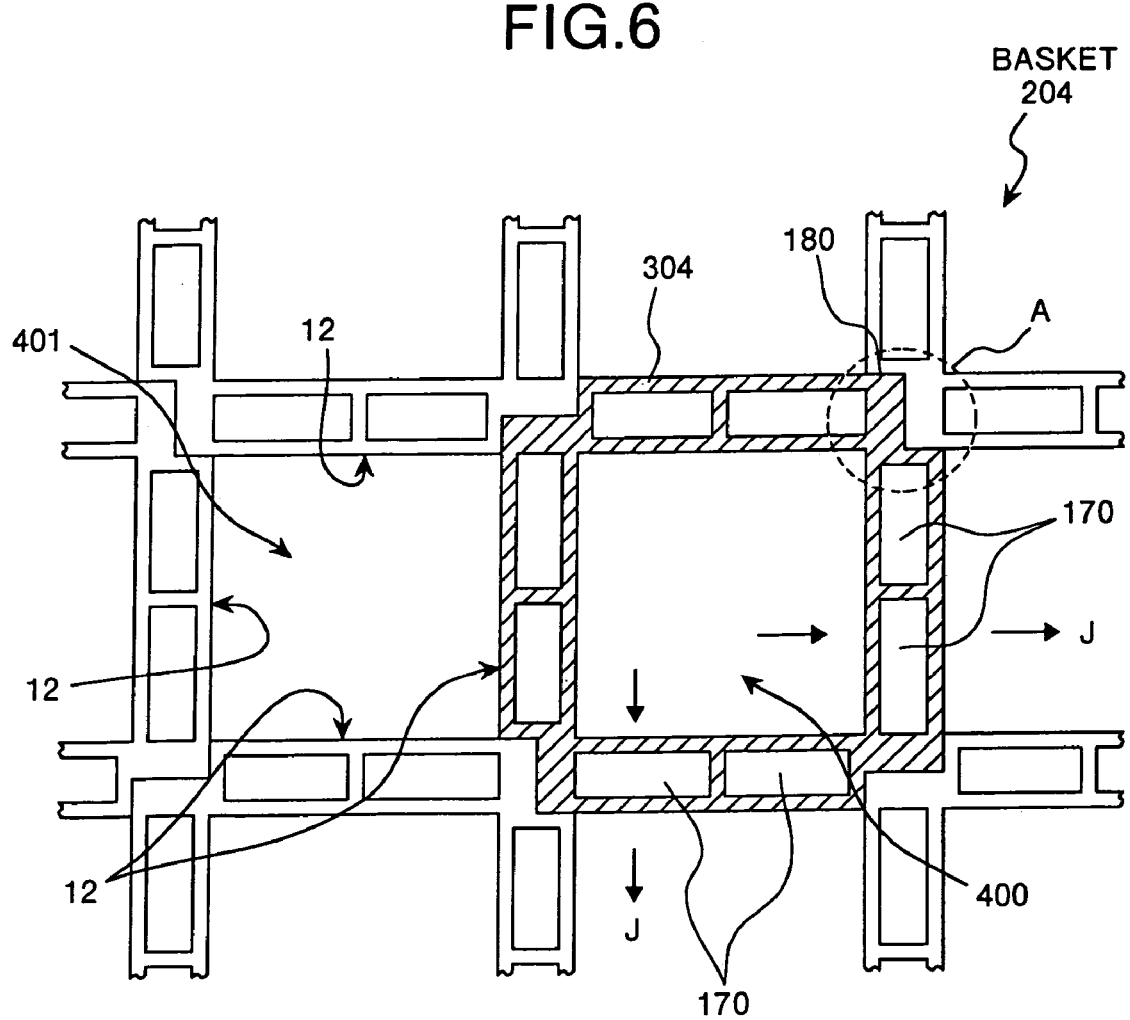
FIG. 6 is a cross-sectional view in the diameter direction that shows one portion of a basket formed by combining square pipes according to a second embodiment of the present invention.

FIG. 6 is a cross-sectional view in the diameter direction that shows one portion of a basket formed by combining square pipes according to a second embodiment of the present invention. As shown in FIG. 6, this square pipe 304 has a virtually square shape in its inner cross-sectional shape in the diameter direction with each corner portion (an area indicated by A in the Figure) molded into a terrace shape. These square pipes 304 constitute a basket which houses spent fuel aggregates for use in PWRs (Pressurized Water Reactors). In PWRs, since the combustion degree of the nuclear fuel becomes higher, the amount of discharge of neutrons is greater in comparison with the spent nuclear fuel of BWRs. Therefore, as shown in FIG. 6, a space is formed inside the side face of the pipe to form a flux trap 170 so that when spent fuel aggregates are housed in the pool, the flux trap 170 is filled with water to speed-reduce neutrons passing through it to the adjacent cell (in the direction of arrow J in the Figure). Thus, these are more easily absorbed by boron contained in the square pipe 304 as a neutron-absorbing material.

When a basket 204 is constructed by these square pipes 304, the square pipes 304 are combined in the staggered arrangement as shown in FIG. 6 so that the terrace portions placed on the corner portions are combined with each other. Thus, the insides of the square pipes 304 and spaces surrounded by side faces 12 of the square pipes 304 in the four directions are allowed to form cells 400 and 401 which house fuel rod aggregates.

Since the flux trap 170 is formed inside the side face 12, this square pipe 304 has a thicker plate thickness in the side face 12 in comparison with the square pipe according to the first embodiment. Therefore, the corner portions of the square pipes 304 are mutually combined with each other by using a wider area so that this arrangement is less susceptible to an offset, and more easily assembled. Moreover, since the heat conductive areas of the butt faces 180 are made wider so that heat generated from the spent fuel aggregates is more easily transmitted to the trunk main body of the cask more efficiently. Furthermore, when this arrangement is applied to the housing rack in a spent fuel storing pool, etc., it is possible to house the spent fuel aggregates more closely, and also to lighten the system as compared with the boron-stainless product, thus, it becomes possible to reduce the load to be imposed on the structure supporting the rack at the time of any abnormal state.

Figure 7:
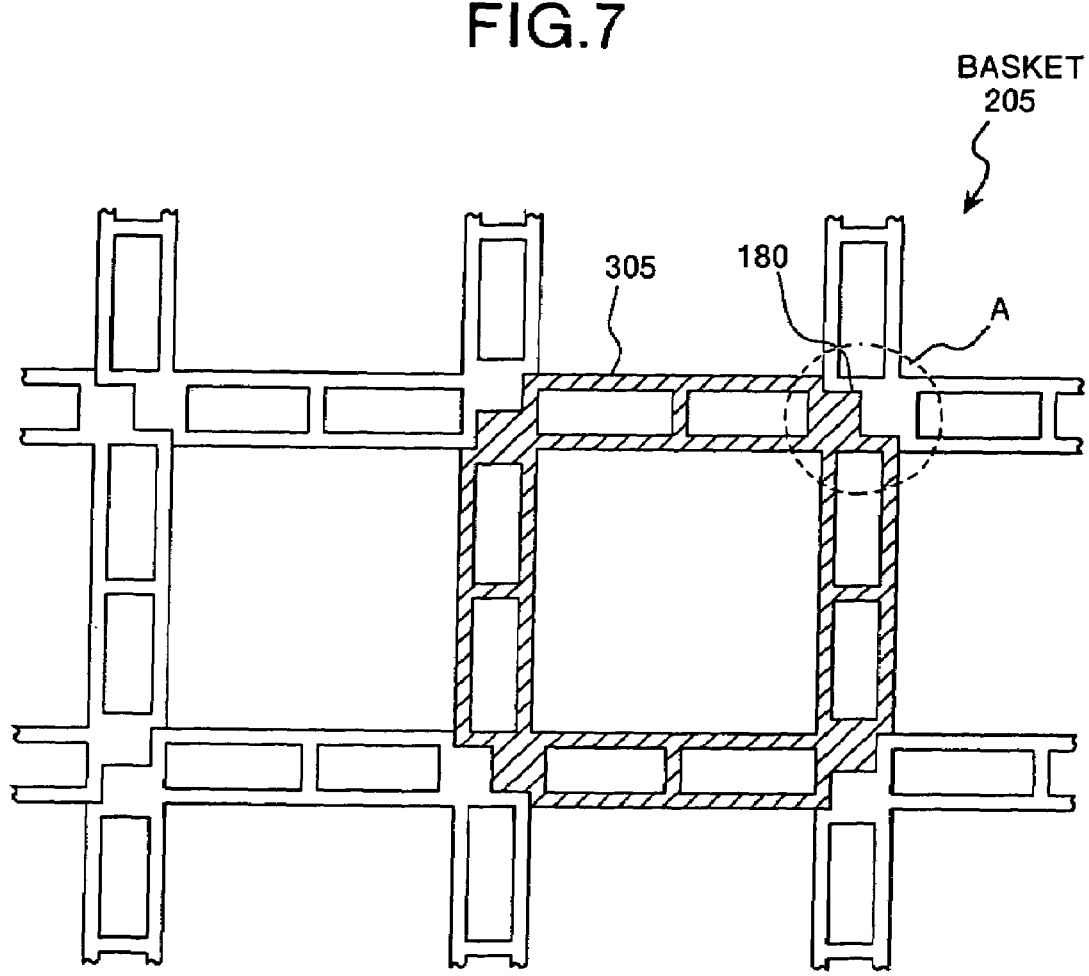
FIG. 7 is a cross-sectional view in the diameter direction that shows a first modified example of a square pipe according to the second embodiment of the present invention.

FIG. 7 is a cross-sectional view in the diameter direction that shows a first modified example of a pipe according to the second embodiment of the present invention. In the above-mentioned square pipe, the corner portion has been molded into a terrace shape with one step, however, this pipe features that the number of steps of the terrace shape is increased so that the corner portion of the pipe 305 (an area indicated by A in the Figure) is molded into a terrace shape with multiple steps. As described earlier, in the square pipe molded into a terrace shape with one step, the plate thickness of the corner portion on which a stress is concentrated is reduced to one-half the thickness of the side face plate of the square pipe (see FIG. 4B). However, in the case of the corner portion having a terrace shape with multiple steps, the plate thickness of the corner portion is maintained to not less than one-half the thickness of the side face plate of the square pipe (see FIG. 4C) For this reason, in comparison with the square pipe having the corner portion molded into a terrace shape with one step, this construction makes it possible to reduce the influence of stress concentration.

Figure 8:
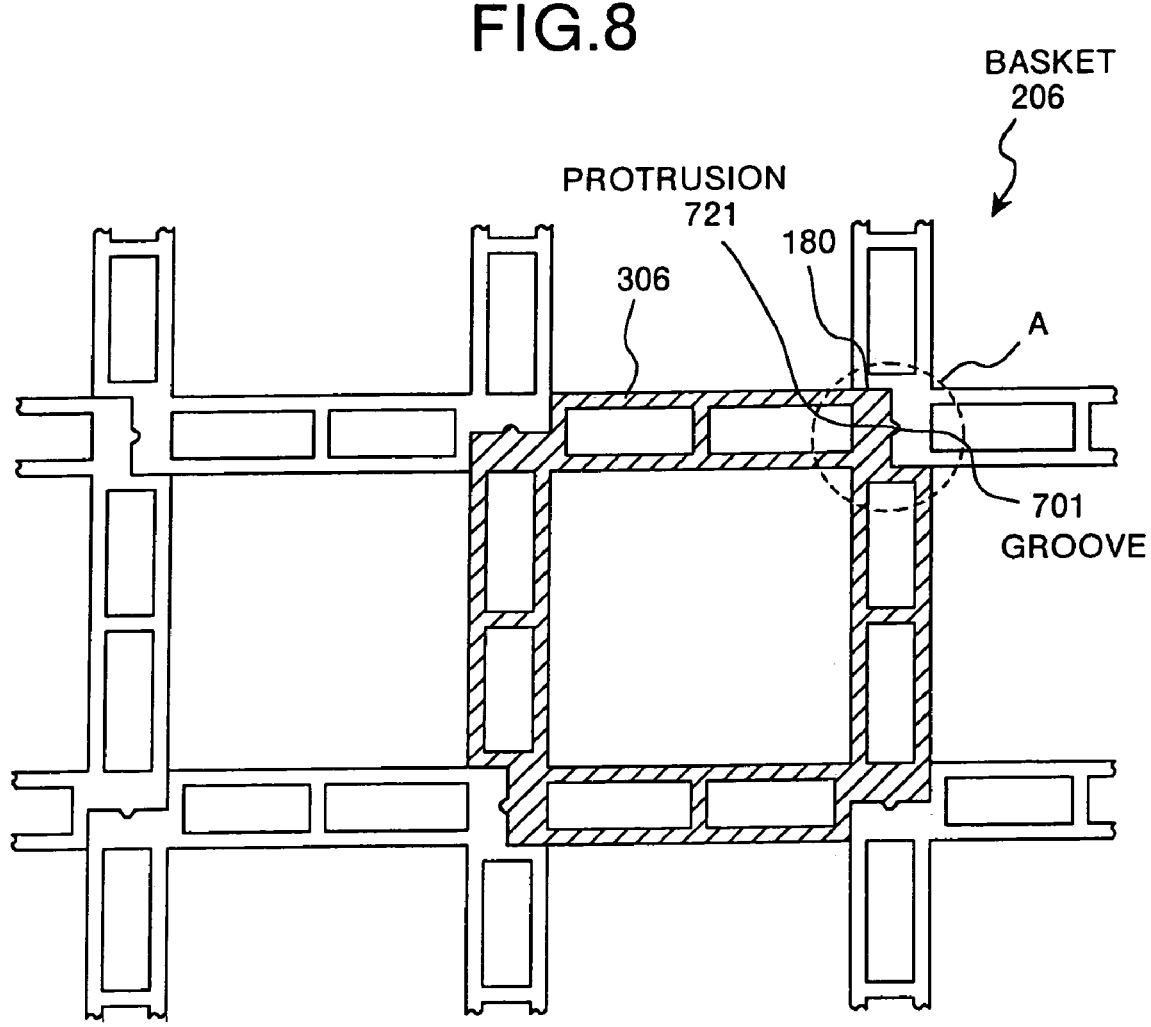
FIG. 8 is a cross-sectional view in the diameter direction that shows a second modified example of a square pipe according to the second embodiment of the present invention.

FIG. 8 is a cross-sectional view in the diameter direction that shows a second modified example of a square pipe according to the second embodiment of the present invention. The square pipe according to this modified example, which is the above-mentioned pipe having a terrace shape in the corner portion (an area indicated by A in the Figure), is provided with a protrusion 721 on one of the butt faces 180 and a groove 701 to which the protrusion 721 is fitted on the other face so as to provide an engaging section. These square pipes 306 are combined with each other to form a basket 206 so that it is less susceptible to an offset since the protrusion 721 is fitted to the groove 701. Therefore, the basket 206 is more easily combined and, if there should be an accidental fall, it is possible to maintain the shape of the basket 206 more firmly. Additionally, grooves may be formed in both of the butt faces 180 of the square pipes 306 to be combined with each other, and, for example, a rod shaped member may be inserted into the space formed by these grooves to form an engaging section, thereby preventing an offset in a direction perpendicular to the axis direction.

Figure 9:
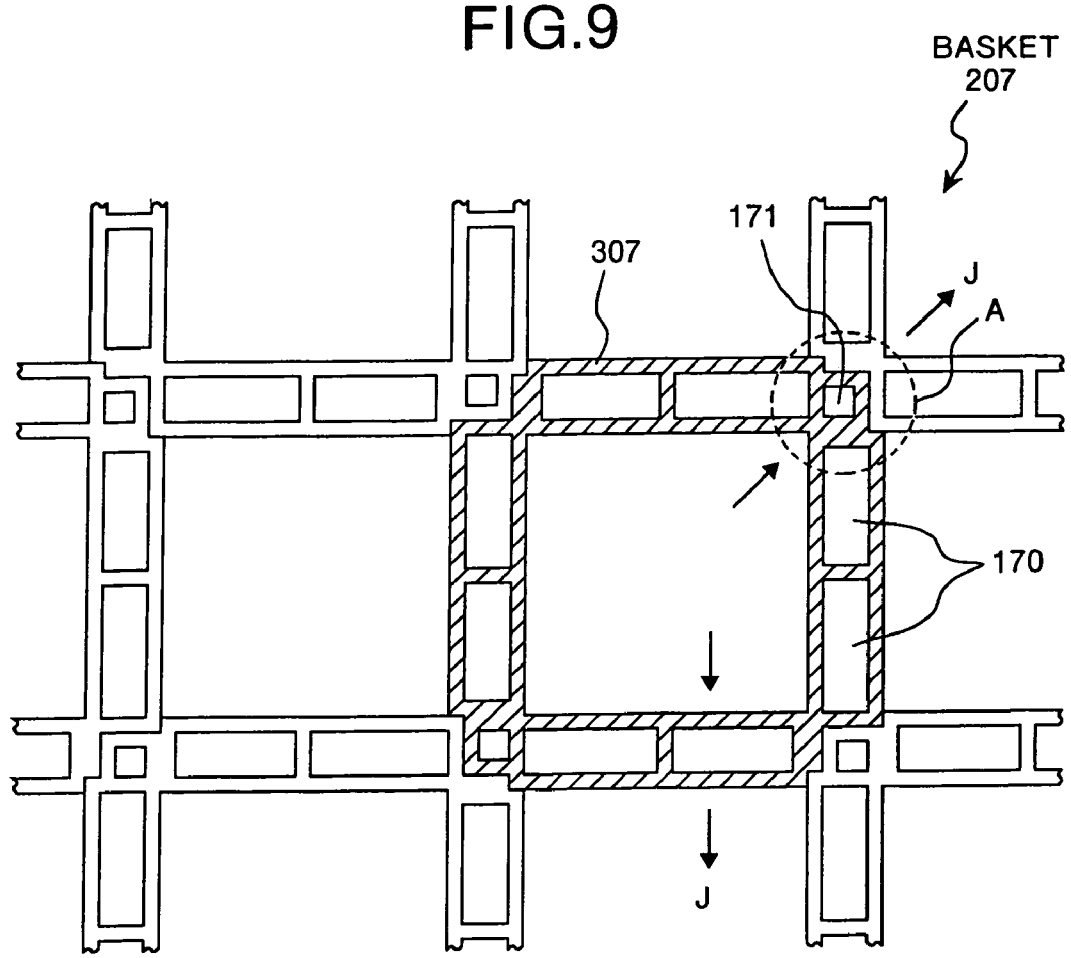
FIG. 9 is a cross-sectional view in the diameter direction that shows a third modified example of a square pipe according to the second embodiment of the present invention.

FIG. 9 is a cross-sectional view in the diameter direction that shows a third modified example of a square pipe according to the second embodiment. The square pipe 307 according to this modified example, which is the above-mentioned square pipe having a terrace shape in the corner portion (an area indicated by A in the Figure), is provided with a flux strap 171 also in the corner portion. For this reason, not only the amount of neutrons perpendicularly passing through the side face of the square pipe 307, but also the amount of neutrons diagonally passing through the corner portion of the square pipe 307, can be reduced to a low level. Moreover, since the addition of this flux trap 171 makes it possible to reduce the mass of the square pipe 307, it is possible to reduce the mass of the entire cask, and the size of the buffer member can be reduced correspondingly.

Figure 10:
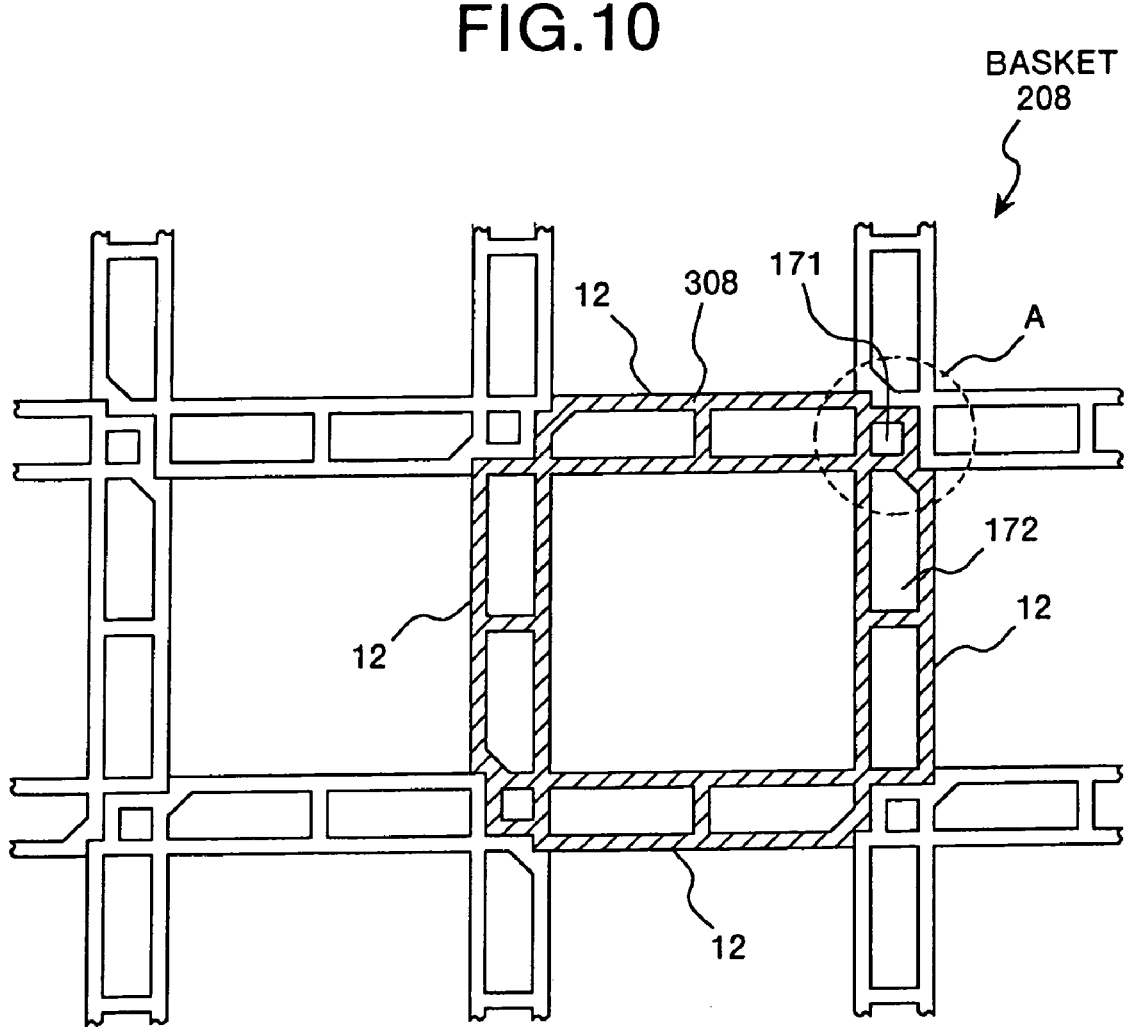
FIG. 10 is a cross-sectional view in the diameter direction that shows a fourth modified example of a square pipe according to the second embodiment of the present invention.

FIG. 10 is a cross-sectional view in the diameter direction that shows a fourth modified example of a square pipe according to the second embodiment. According to this modified example, there is provided the square pipe 308, which is the above-mentioned square pipe having the flux strap 171 also in the corner portion (an area indicated by A in the Figure), wherein the cross-sectional shape perpendicular to the axis direction of the flux trap 172 formed inside the side face 12 is made coincident with the shape of the terrace portion formed in the corner portion. The state "being made coincident with the shape of the terrace portion" includes not only being made coincident with the terrace portion but also being made coincident diagonally with the shape, as shown in FIG. 10. In addition to the effects obtained through the third modified examples, this arrangement makes it possible to expand the flux trap 172 formed inside the side face to the vicinity of the corner portion, thus, it is possible to widen the area to speed-reduce neutrons. Moreover, it becomes possible to ensure a sufficient thickness in the vicinity of the corner portion and consequently to ensure a sufficient rigidity, so as to reduce the stress concentration.

Figure 11:
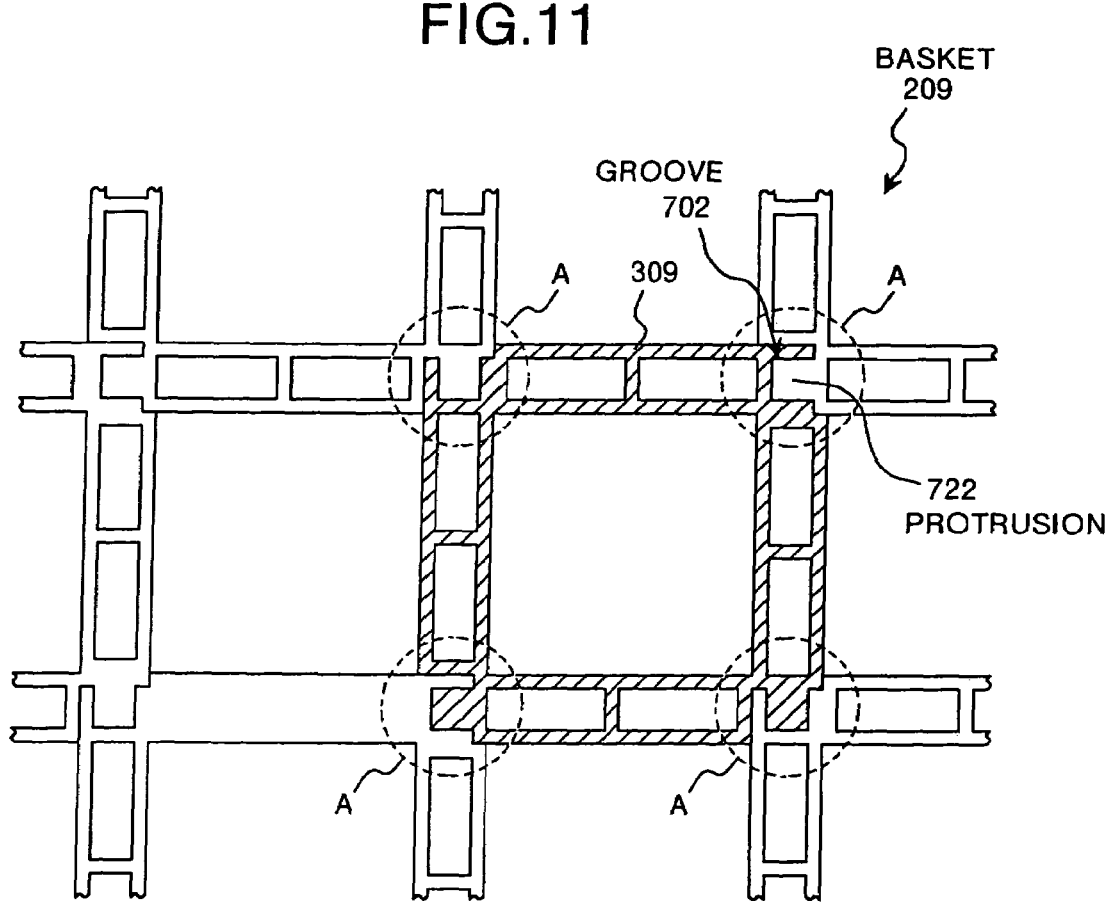
FIG. 11 is a cross-sectional view in the diameter direction that shows a fifth modified example of a square pipe according to the second embodiment of the present invention.

FIG. 11 is a cross-sectional view in the diameter direction that shows a fifth modified example of a square pipe according to the second embodiment. According to this modified example, there is provided the square pipe 309 wherein, with respect to the connecting sections formed on the four corner portions of the square pipe (areas indicated by A in the Figure), at least two adjacent connecting sections have directions in which they are engaged with the respective connecting sections of square pipes 309 diagonally adjacent thereto, and the directions are different from each other by virtually 90 degrees. In this arrangement, the corner portions are respectively provided with a protrusion 722 and a groove 702 to which the protrusion is fitted so as to have an engaging structure. Square pipes 309 are coupled to each other through these protrusion 722 and groove 702 so that the square pipes 309 are less susceptible to coming off when combined with each other, and easily combined to form a basket 209. Moreover, these square pipes 309 are less susceptible to rattling, and, if there should be an accidental fall, it is possible to maintain the shape of the basket 209 more firmly. Moreover, since it is possible to widen the heat conductive area, decay heat generated from the spent fuel aggregates can be transmitted efficiently. A flux trap may be placed in the corner portion also in the present modified example.

Since the square pipe according to this modified example has an engaging structure in each of the corner portions, this is suitably applied to the case in which a basket for use in PWRs, which has a greater apparent side-face plate thickness, is constructed, or this may be also applied to a basket for use in BWRs. In this case, it is preferable to make the thickness of the side face thicker than that of the square pipe normally used for BWRs.

FIG. 12 is a cross-sectional view in the diameter direction that shows a sixth modified example of a square pipe according to the second embodiment. In the above-mentioned square pipe, corner portions (areas indicated by A in the Figure) have connecting sections each having an engaging structure, however, this square pipe 310 is that, with respect to the connecting sections formed on the four corner portions, at least two adjacent connecting sections have directions in which they are engaged with the respective connecting sections of square pipes 310 diagonally adjacent thereto, and the directions are different from each other by virtually 90 degrees. These are combined with each other through a dovetail groove 700 and a dovetail joint 720 formed on the respective corner portions of the square pipes 310.

When a basket 210 is constructed, the dovetail joint 720 formed on one of the square pipe 310 is fitted to the dovetail groove 700 formed in the other square pipe 310 so as to combine the square pipes 310 with each other. Square pipes 310 are coupled to each other through these dovetail groove 700 and dovetail joint 720 so that the combined square pipes 310 are less susceptible to coming off from each other and a positional offset between the square pipes 310. The square pipes 310 according to this modified example are easily assembled into a basket 210, and the assembling operation is carried out with the square pipes 310 placed longitudinally so as to construct the basket 210.

Figure 13A:
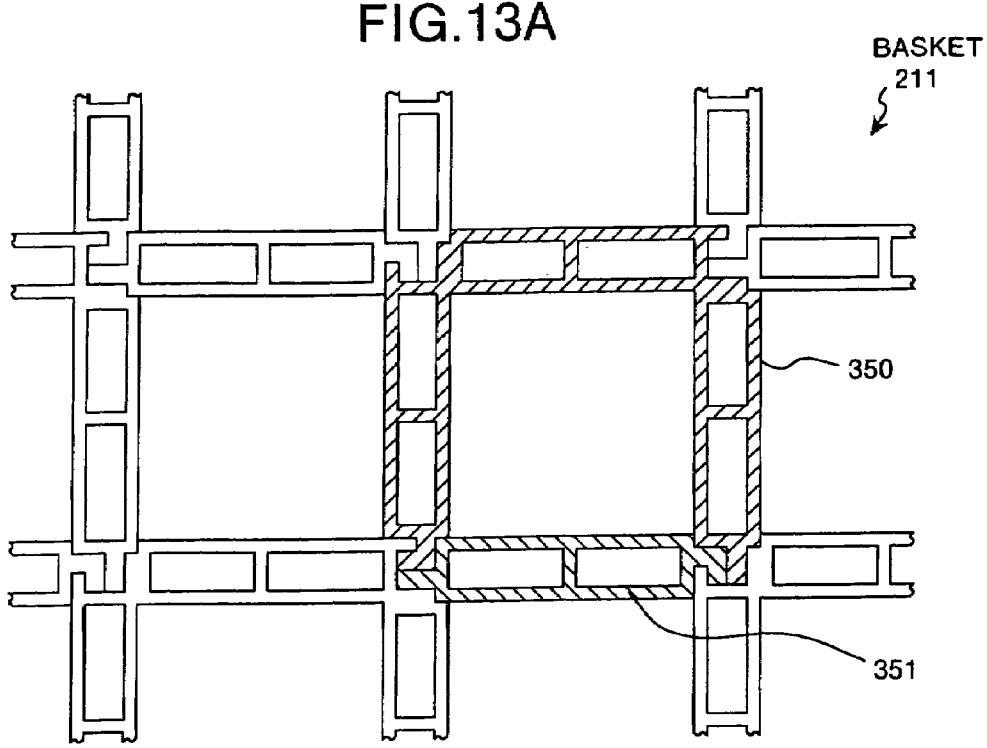
FIG. 13A and FIG. 13B are cross-sectional views in the diameter direction that shows a structural example of a basket according to the second embodiment of the present invention.
Figure 13B:
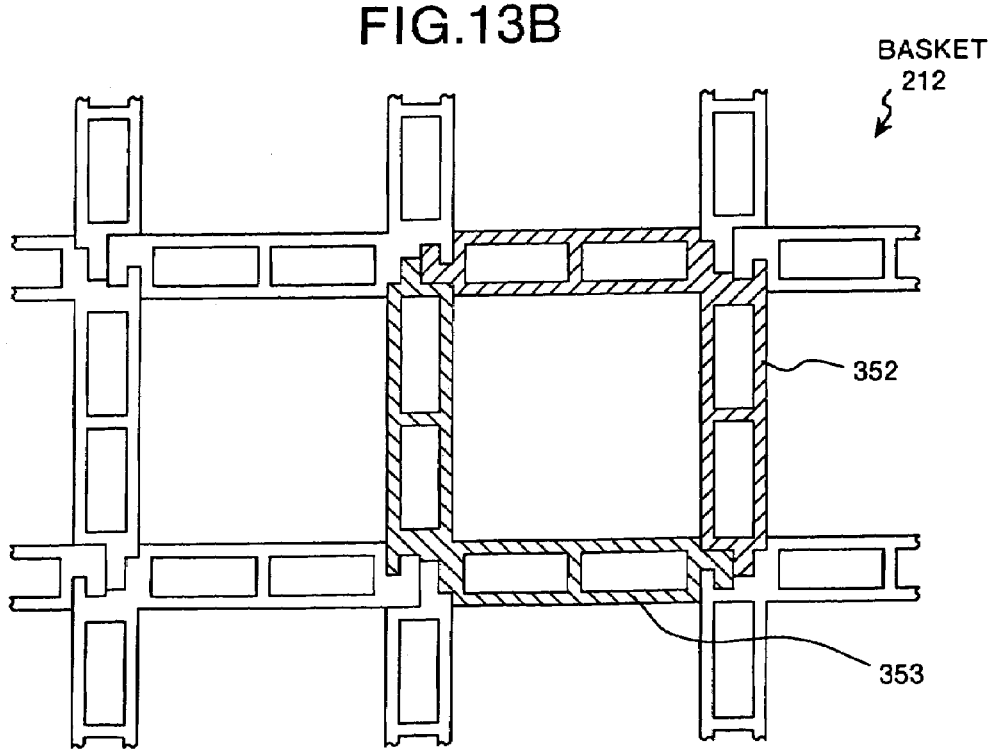

FIG. 13A and FIG. 13B are cross-sectional views in the diameter direction that shows a structural example of a basket according to the second embodiment. These baskets 211 and 212 feature that the above-mentioned square pipe is divided into a plurality of elements and these elements are combined to form the basket. FIG. 13A shows an example in which a square pipe is formed by combining a divided element 350 having a "ko"-letter shape (Japanese Kana character) in its cross-section and a divided element 351 having a linear shape. Moreover, FIG. 13B shows an example in which a square pipe is formed by combining divided elements 352 and 353, each having an L-letter shape. With this arrangement, it becomes possible to construct a cell having a size greater than the size that is available by an extrusion molding machine, and these cells can be molded through an extrusion molding machine that uses a smaller molding pressure. This basket is suitably applied to a basket for use in PWRs having a greater apparent side-face plate thickness, or this may be also applied to a basket for use in BWRs without a flux trap.

Figure 14:
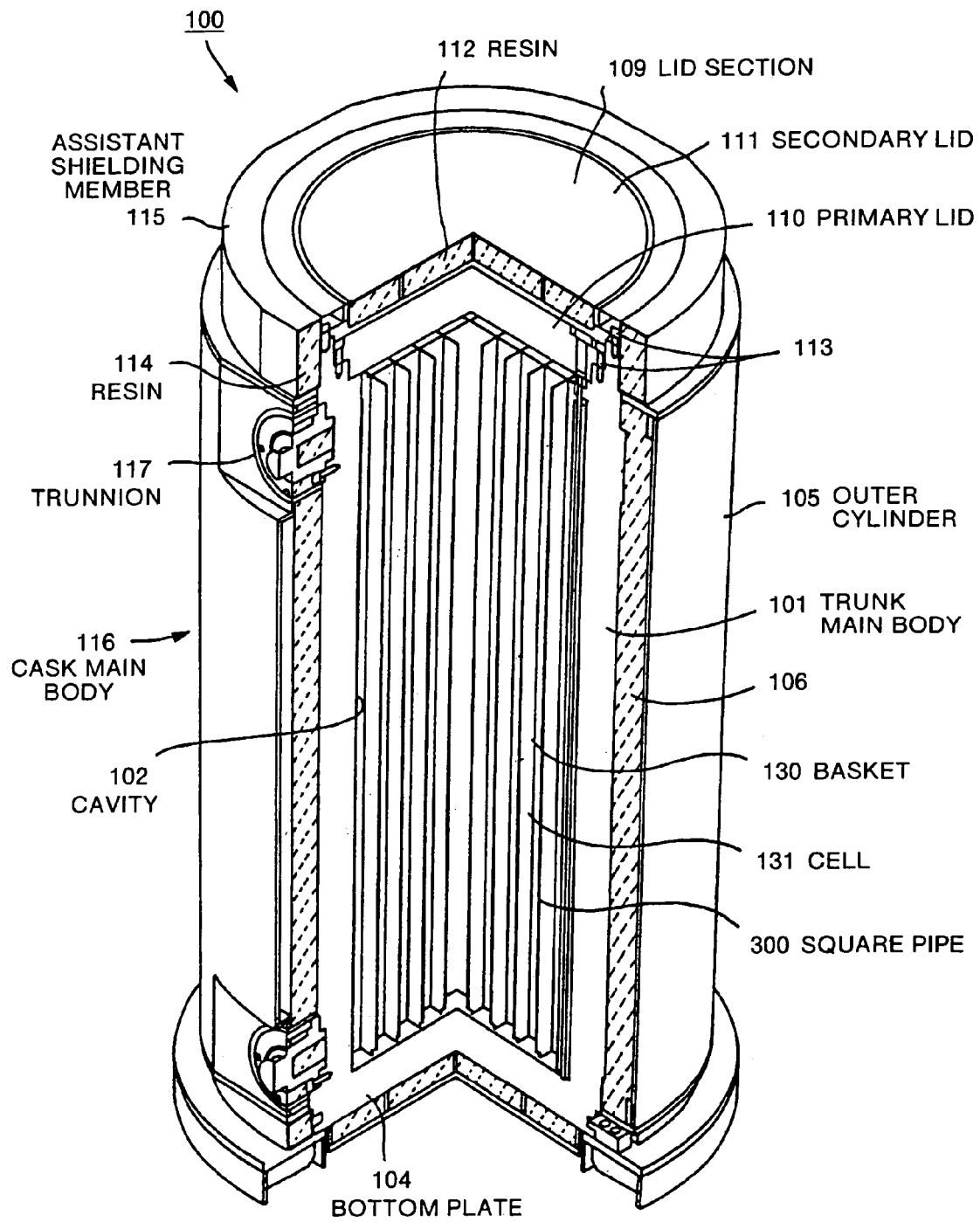
FIG. 14 is a perspective view that shows a cask according to a third embodiment of the present invention.
Figure 15:
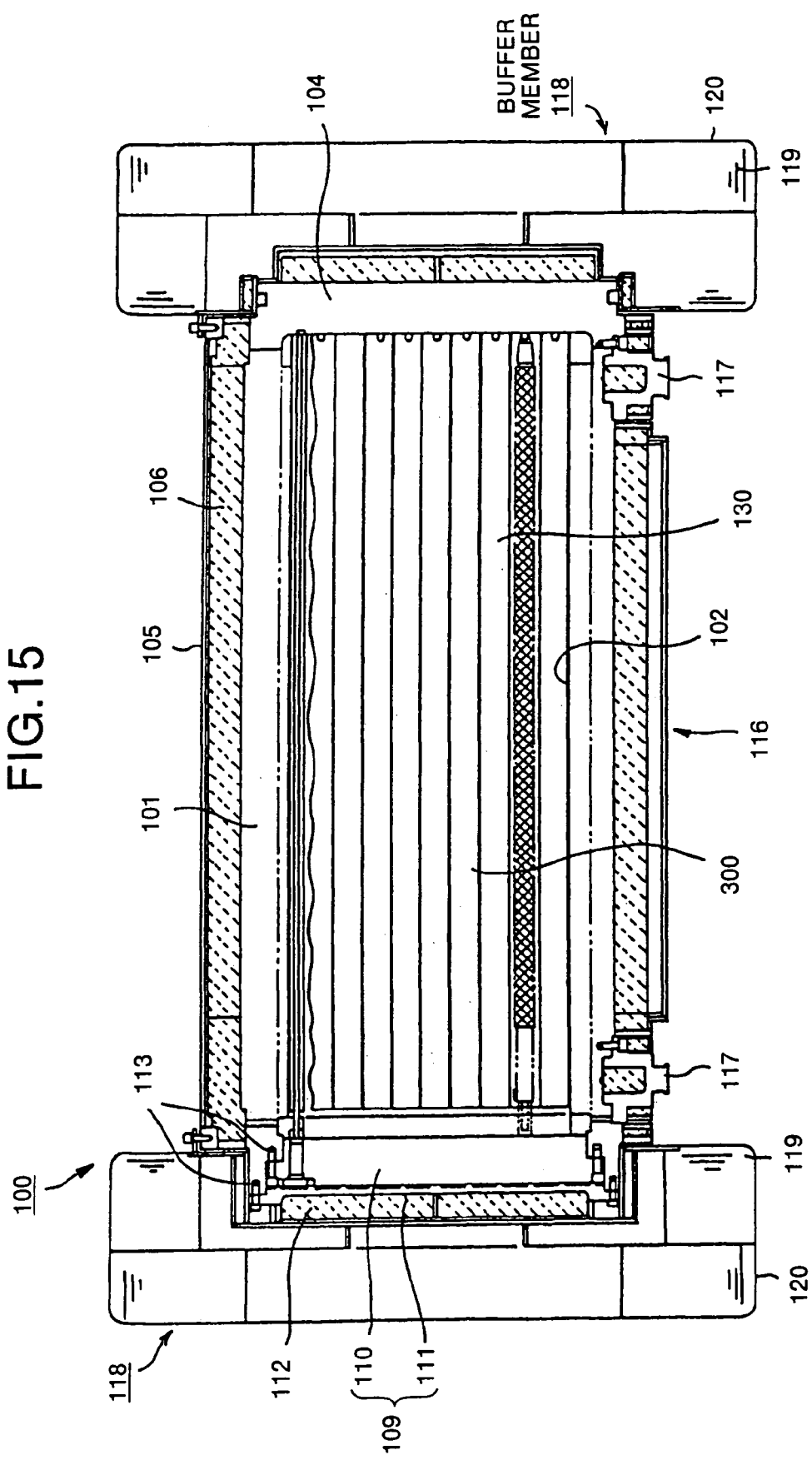
FIG. 15 is a cross-sectional view in the axis direction of the cask shown in FIG. 14.
Figure 16:
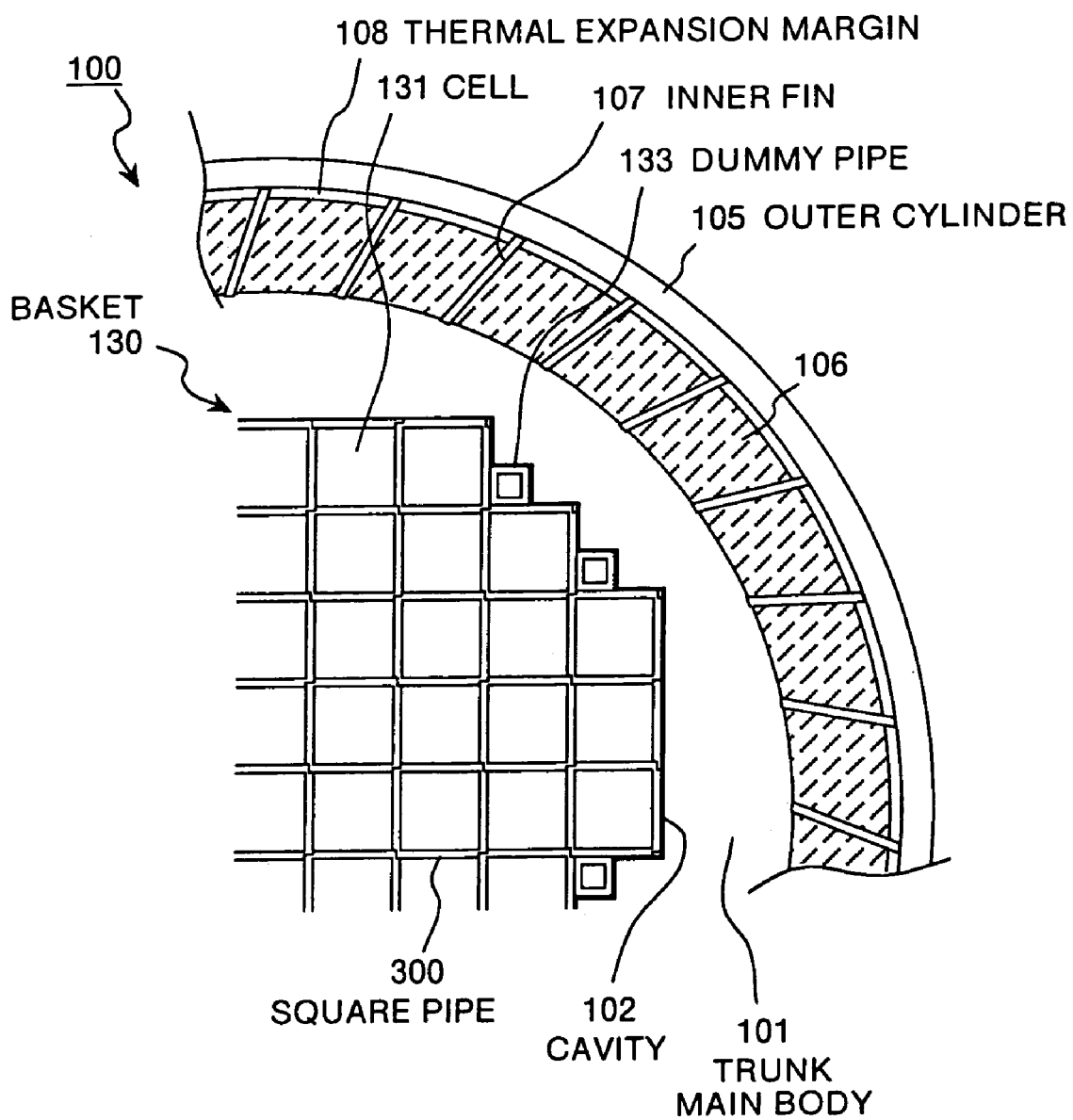
FIG. 16 is a cross-sectional view in the diameter direction of the cask shown in FIG. 14.
Figure 23:
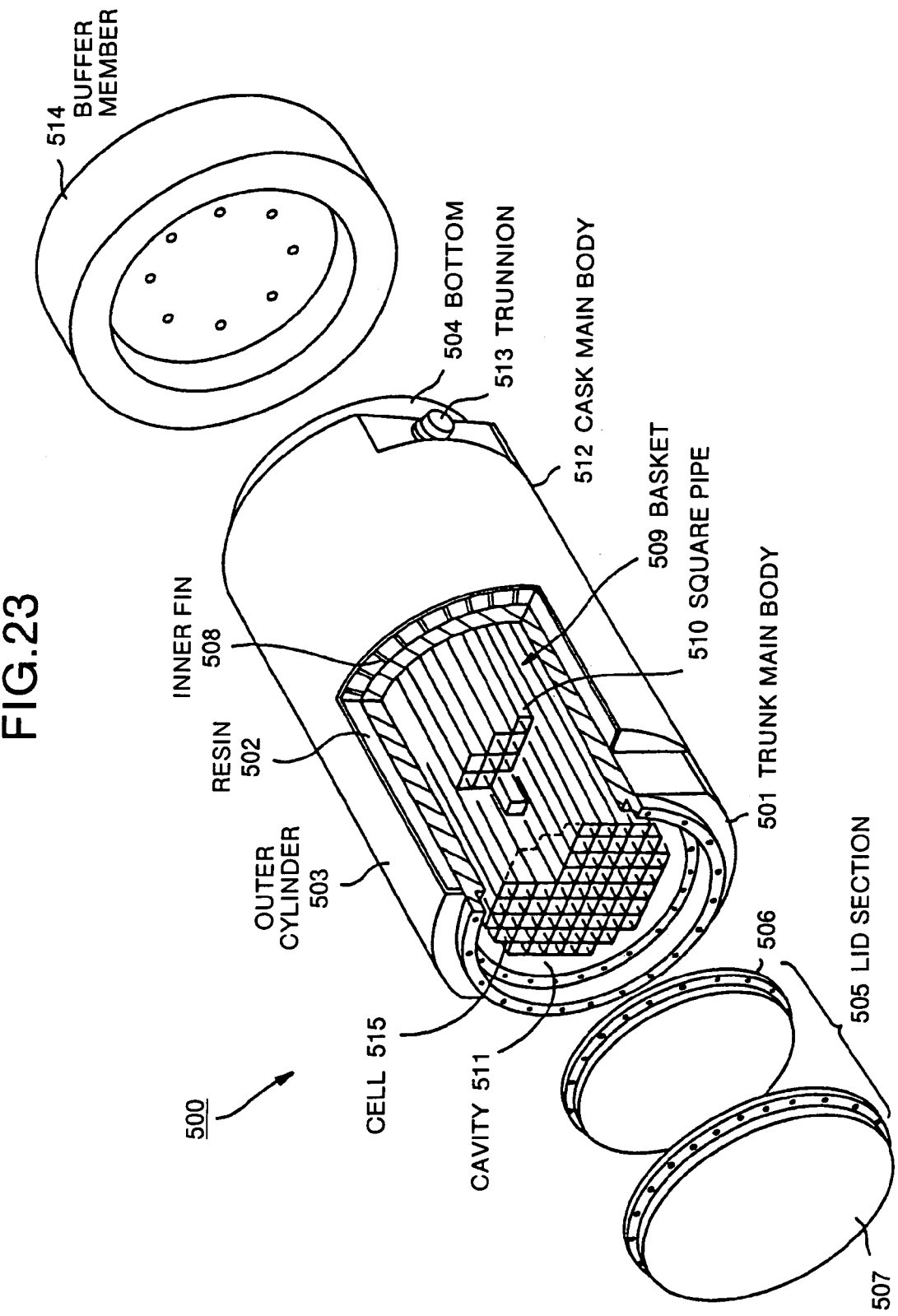
FIG. 23 is a perspective view that shows one example of a cask.
Figure 24:
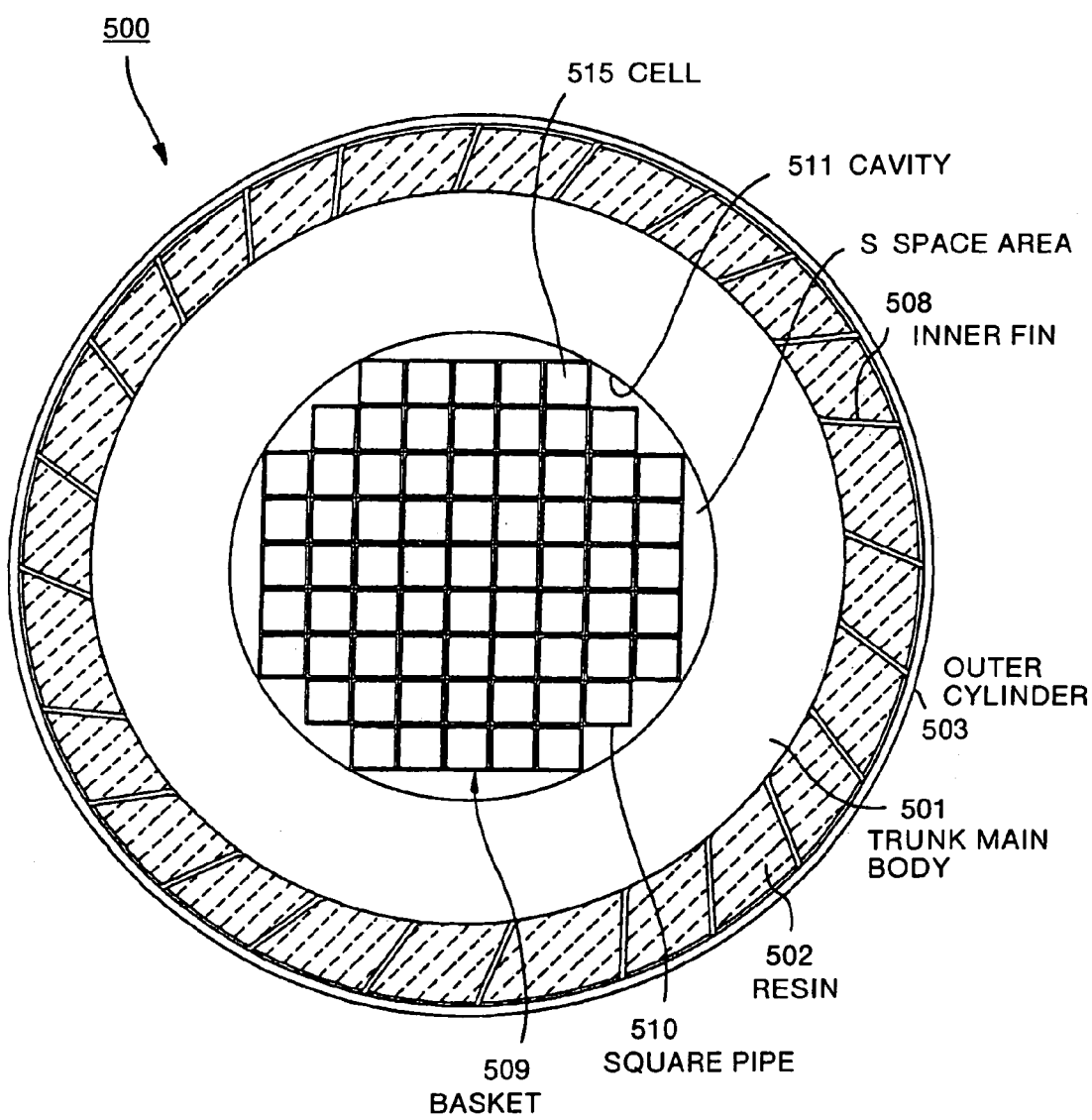
FIG. 24 is a cross-sectional view in the radial direction of the cask shown in FIG. 23.

Next, the following description will discuss a basket constructed by the above-mentioned pipes 300 together with the entire cask as a third embodiment of the present invention. Not limited by the square pipe 300, the basket can be constructed by using the other square pipes disclosed in the above-mentioned first and second embodiments. FIG. 14 is a perspective view that shows a cask according to a third embodiment of the present invention. FIG. 15 is a cross-sectional view in the axis direction of the cask shown in FIG. 14. FIG. 16 is a cross-sectional view in the diameter direction of the cask shown in FIG. 14. FIG. 16 shows only a ¼ of the entire structure. This cask 100, which virtually has the same structure as the cask 500 shown in FIG. 23, is that the inside of a cavity 102 of the trunk main body 101 is formed into a shape that is coincident with the outer shape of the basket 130. The shape of the inner face of the cavity 102 is formed by fraise machining carried out by using a dedicated machining device, which will be described later. In addition to the fraise machining, this may be formed by shaper machining. Moreover, the machining device, which will be described later, is a so-called lateral machining device in which machining is carried out with the container being placed laterally, however, not limited to this, a longitudinal machining device in which machining is carried out with the container being placed longitudinally may be used.

In the cask 100 shown in the same Figure, a trunk main body 101 and a bottom plate 104 are roller forged products made of carbon steel having a γ-ray shielding function. Instead of carbon steel, stainless steel may be used. The trunk main body 101 and the bottom plate 104 are joined to each other by welding, etc. Moreover, in order to ensure a sealing performance as a pressure-resistant container, a metal gasket is interpolated between the lid section 109 and the trunk main body 101. The trunk main body 101 and the bottom plate 104 may be molded as an integral part by using a processing method such as a hot-cast expansion molding method. In this case, since a welding process and a heat treatment process after the welding can be omitted, it is possible to make the manufacturing process easier.

A neutron-shielding material 106, such as resin and silicone rubber, that is a high-molecular material with a high hydrogen content, having a neutron-shielding function, is injected between the trunk main body 101 and the outer cylinder 105. Moreover, a plurality of inner fins 107 used for thermal conduction are welded between the trunk main body 101 and the outer cylinder 105 so that the neutron shielding member 106 is injected into gaps formed by the inner fins 107 in a fluid state, and solidified therein through a thermo-setting reaction or the like. With respect to the inner fins 107, a material having a high thermal conductivity such as Cu and Al is preferably used as the inner fins 107, and it is preferable to place them with a higher density in a place having a higher quantity of heat so as to carry out heat radiation uniformly. Moreover, a thermal expansion margin 108 of several millimeters is placed between the neutron shielding member 106 and the outer cylinder 105. This thermal expansion margin 108 is formed as follows, first, a sublimation mold formed by embedding a heater in a hot-melt bonding agent is placed on an inner surface of the outer cylinder 105, and to this is injected the neutron shielding material 106 and solidified therein, and the heater is then heated and the material is melted and discharged (not shown). Moreover, another arrangement may be used in which, a honeycomb material having predetermined strength is placed inside the thermal expansion margin 108 so that the honeycomb material may be compressed as the neutron shielding member is thermally expanded.

The lid section 109 is constituted by a primary lid 110 and a secondary lid 111. This primary lid 110 has a disc shape made of a material such as stainless steel and carbon steel which shields γ-rays. Moreover, the secondary lid 111 also has a disc shape made of stainless steel, etc., and resin 112 is sealed in the upper face thereof as a neutron shielding member. The primary lid 110 and the secondary lid 111 are attached to the trunk main body 101 by stainless bolts 113. Further, metal gaskets are respectively placed between the primary lid 110 as well as the secondary lid 111 and the trunk main body 101 so as to maintain the sealing property inside thereof. Moreover, an assistant shielding member 115 in which resin 114 is sealed is placed on the periphery of the lid section 109.

Trunnions 117 which suspends the cask 100 are placed on both of the sides of the cask main body 116. FIG. 14 shows the structure with the assistant shielding member 115 attached thereto, however, at the time of transportation of the cask 100, the assistant shielding member 115 is detached and a buffering member 118 is attached thereto (see FIG. 15). This buffering member 118 has a structure in which a buffering material 119 such as red wood material is sealed inside the outer cylinder 120 formed by a stainless steel material. Moreover, the shielding function may be enhanced so as to eliminate the necessity of using the assistant shielding member 115. In this case, it is not necessary to attach and detach the assistant shielding member 115 so as to attach and detach the buffering member 118, and consequently to reduce the operation tasks.

Although not clearly shown by FIG. 16, the basket 130 is assembled by 21 square pipes 300 that constitute 69 cells 131 which houses spent fuel aggregates. Each of the square pipes 300 is made of an aluminum composite member formed by adding powder of B or B compound having a neutron-absorbing function to Al or Al alloy powder. Moreover, with respect to the neutron-absorbing material, besides boron, cadmium may be used. The number of the square pipes 300 is not limited by this example, and it is properly increased or decreased depending on the design of the basket, cask, etc.

Figure 17:
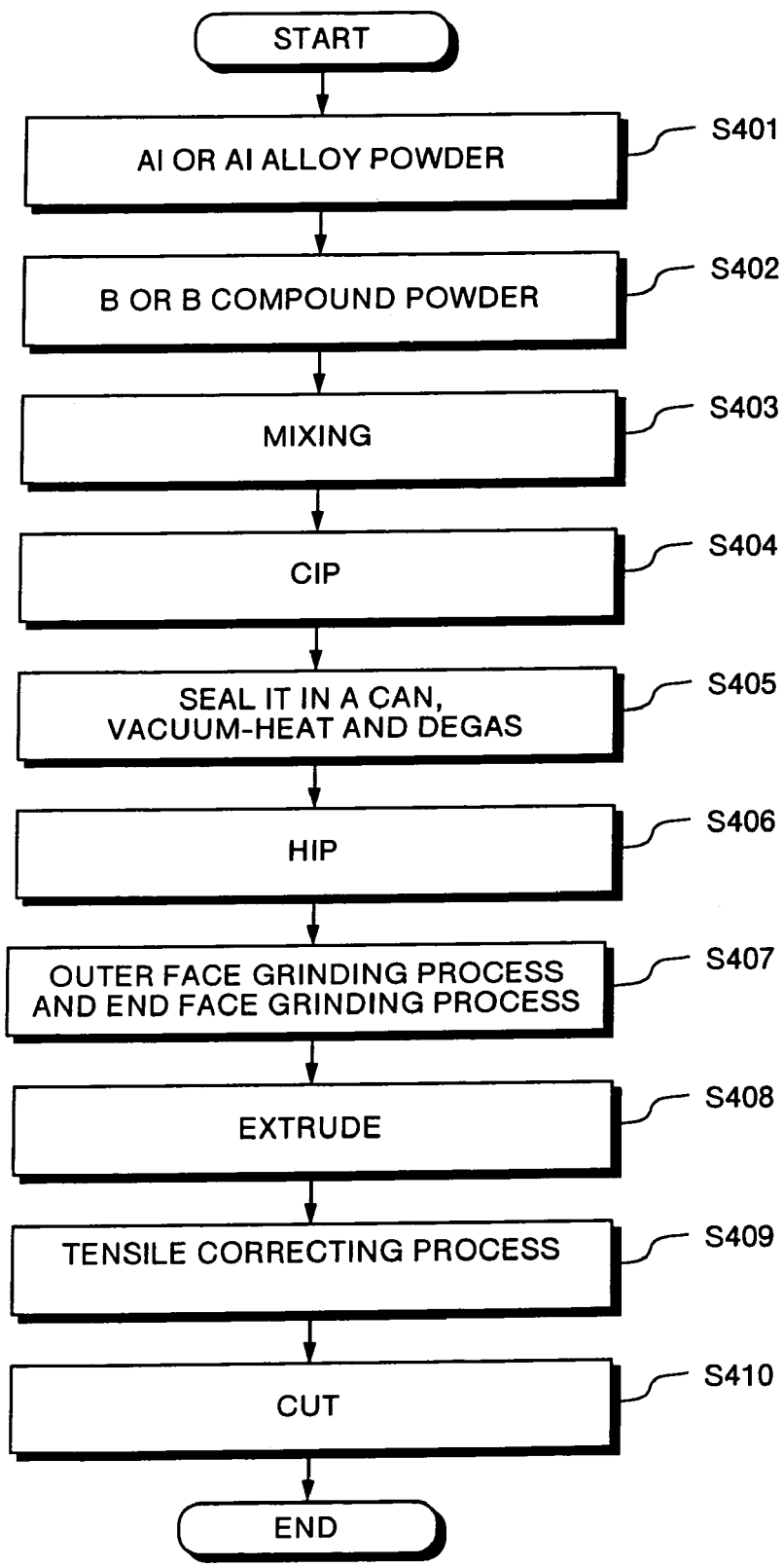
FIG. 17 is a flow chart that shows a manufacturing method of the above-mentioned square pipe.

FIG. 17 is a flow chart that shows a manufacturing method of the above-mentioned square pipe. First, Al or Al alloy powder is prepared by a quenching solidification method such as an atomizing method (step S401), and power of B or B compound is also prepared (step S402), then, these two particles are mixed with each other by a cross rotary mixer, etc. for 10 to 15 minutes (step S403).

With respect to Al or Al alloy, examples thereof include, pure aluminum metal, Al—Cu-based aluminum alloy, Al—Mg-based aluminum alloy, Al—Mg—Si-based aluminum alloy, Al—Zn—Mg-based aluminum alloy and Al—Fe-based aluminum alloy. Moreover, with respect to the above-mentioned B or B compounds, examples thereof include $B_4C$ and $B_2O_3$. The amount of addition of boron to aluminum is preferably set in the range of not less than 1.5 weight % to not more than 9 weight % based upon the B-amount conversion. More preferably, it is set in the range of not less than 2.0 weight % to not more than 5.0 weight %. The amount of not more than 1.5 weight % fails to provide a sufficient neutron-absorbing function, and the amount exceeding 9 weight % makes it impossible to carry out a molding operation and also causes a reduction in the ductility of the resulting material. In the case of the same amount of addition of boron to aluminum, the application of enriched boron $B^{10}$ makes it possible to enhance the neutron-absorbing capability in comparison with natural boron. For example, in general, the rate of $B^{10}$ in natural $B_4C$ is approximately 19%, however, when $B_4C$ in which $B^{10}$ is enriched to 98% is used, the same amount of addition of $B_4C$ increases the neutron-absorbing capability to approximately 5 times. Therefore, in the case of the application of enriched boron, it is possible to provide the same neutron-absorbing capability by using a thinner plate thickness in comparison with a case in which natural boron is used. Moreover, in the case of the same plate thickness and neutron-absorbing capability, it is possible to reduce the amount of application of boron.

Next, the mixed powder is sealed in a rubber case and this is subjected to a powder molding process by uniformly applying a high pressure from all the directions at normal temperature by using CIP (Cold Isostatic Press) (step S404). The molding conditions of CIP are, 200 MPa in molding pressure, 600 mm in the diameter and 1500 mm in length in the molded product. By applying a pressure uniformly from all the directions by using CIP, it is possible to provide a molded product that has a high density and is less susceptible to deviations in the molding density.

Successively, the above-mentioned powder molded product is vacuum-sealed into a case, and heated to 300° C. (step S405). This degassing process eliminates gas components and moisture component from the case. In the nest process, the molded product that has been vacuum-degassed is re-molded by HIP (Hot Isostatic Press) (step S406). The molding conditions of HIP are, temperature 400° C. to 450° C., time 30 sec, and pressure 6000 ton, and the diameter of the molded product is set to 400 mm. An outer face grinding process and an end face grinding process are carried out so as to remove the case (step S407), and a hot-case extrusion is carried out on the billet by using a port hall extruder (step S408). In this case, with respect to the extrusion conditions, the heating temperature is set in the range of 500° C. to 520° C. and the extruding speed is set to 5 m/min. The die used in this extruding process is set to have the same cross-sectional shape as the outer shape of a pipe to be molded so that the pipe explained in the above-mentioned embodiment can be molded.

Without sealing the molded product in the case by using CIP in step S405, it may be re-molded by HIP after having been vacuum-degassed in the HIP container. This arrangement makes it possible to eliminate the outside grinding process which removes the case, and consequently to reduce the process. Moreover, in place of the HIP process, vacuum sintering and vacuum hot pressing processes may be used. In this case also, since it is possible to eliminate the outside grinding process which removes the case, time-consuming tasks are not required for the manufacturing process.

Next, after the extrusion molding process, the resulting product is subjected to a tensile correcting process (step S409), and a non-normal portion and an evaluation portion are cut to form a product (step S410). As shown in FIG. 1, the square pipe 300 thus completed has a square shape having one side of 162 mm and an inner side of 151 mm in its cross-section. Moreover, the corner portion of the square pipe 300 is molded into a sharp edge having a radius R=not more than 1.0 mm through an extruding process. The dimension tolerance is set to 0 with respect to minus tolerance based upon the standard required. Additionally, with respect to the manufacturing method of this square pipe 300, the applicant of the present invention has applied another method for a patent on May 27, 1999 ("basket and cask"), therefore, the manufacturing process may be carried out by reference to this method.

The square pipe 300, manufactured through the above-mentioned processes, is successively inserted following the machined shape inside the cavity 102. When there are bending and twisting occurring in the square pipe 300, since the minus tolerance of the dimension is zero, an attempt to insert the square pipe 300 causes a difficulty in insertion due to accumulation of tolerances and influence of bending, and a forceful insertion causes an excessive stress applied on the square pipe 300. For this reason, with respect to all or some square pipes 300 thus manufactured, bending and twisting thereof may be preliminarily measured by a laser measuring device, etc., and an optimal inserting position is found based upon the measured data by using a computer. This arrangement makes it possible to easily insert the square pipe 300 into the cavity 102, and it is also possible to uniformly set the stress imposed on the respective square pipes 300.

Moreover, as shown in FIG. 16, among cavities 102, dummy pipes 133 are respectively inserted on both of the sides of the square pipe row having the number of cells of five or seven. The objects of these dummy pipes 133 are, to reduce the weight of the trunk main body 101, to make the thickness of the trunk main body 101 uniform and to firmly secure the square pipe 300. This dummy pipe 133 is also made of aluminum containing boron, and manufactured in the same processes as described above. These dummy pipes 133 may be made of simple aluminum material or may be omitted if there is no necessity of reducing the weight, etc.

Figure 18:
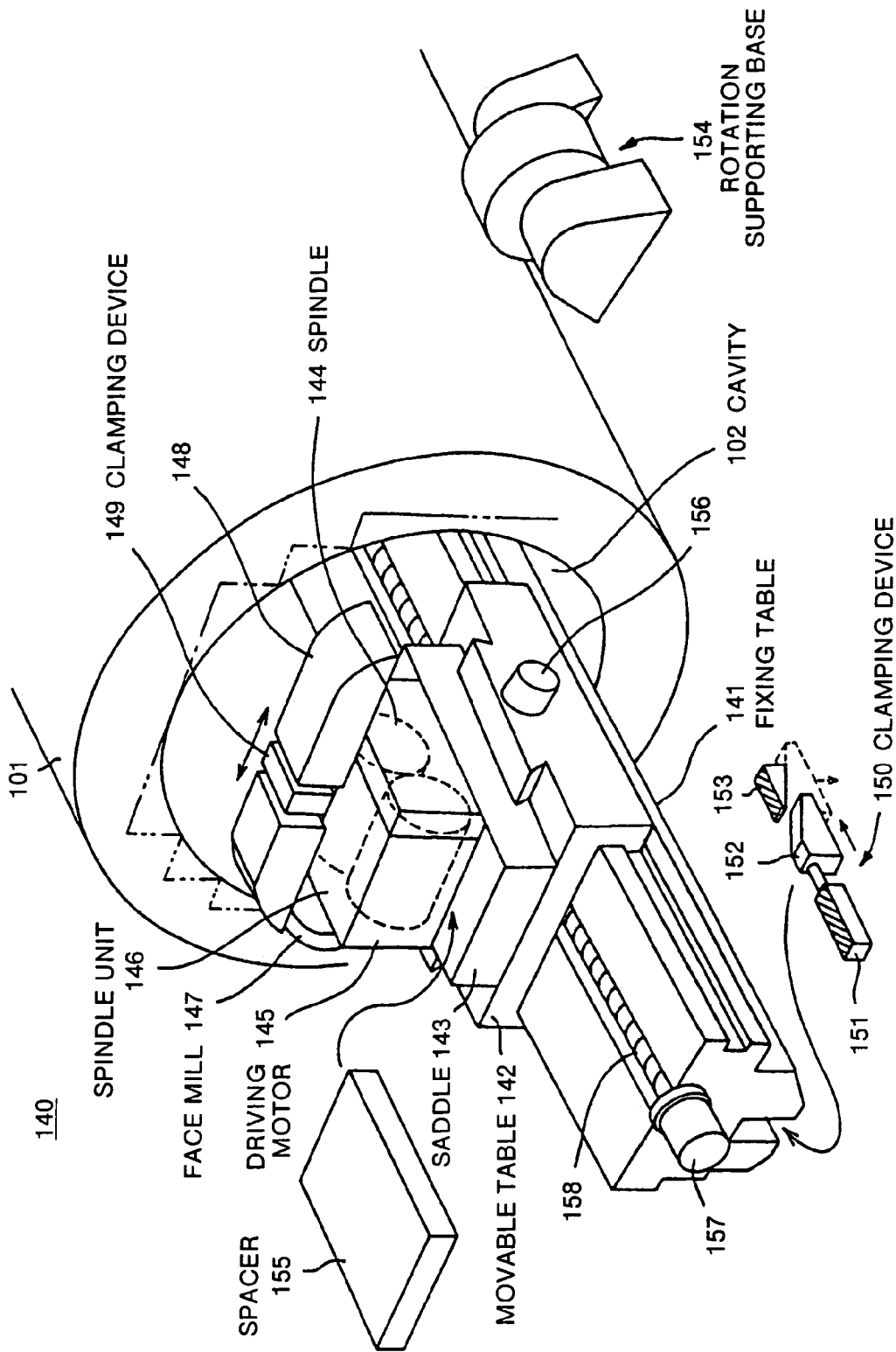
FIG. 18 is a schematic perspective view that shows a machining device of the cavity 102.

Next, an explanation will be given of a case in which the machining of the cavity 102 of the trunk main body 101 is carried out by using a lateral machining device. FIG. 18 is a schematic perspective view that shows a machining device of the cavity 102. This machining device 140 is constituted by a fixing table 141 that is allowed to penetrate the inside of the trunk main body 101 and placed and fixed inside the cavity 102, a movable table 142 that is allowed to slide on the fixing table 141, a saddle 143 that is positioned and secured on the movable table 142, a spindle unit 146 constituted by a spindle 144 and a driving motor 145 placed on the saddle 143, and a face mill 147 placed on a spindle axis.

Moreover, a repulsive force receiver 148 made by molding the contact portion according to the inner shape of the cavity 102 is placed on the spindle unit 146. This repulsive force receiver 148, which is freely attached and detached, is allowed to slide in the arrow direction in the Figure along a dovetail groove (not shown). Moreover, the repulsive force receiver 148 is provided with a clamping device 149 with respect to the spindle unit 146, and secured to a predetermined position.

Moreover, a plurality of clamping devices 150 are attached to the lower groove of the fixing table 141. Each clamping device 150 is constituted by a hydraulic cylinder 151, a shift block 152 having a wedge shape attached to the hydraulic cylinder 151 and a fixing block 153 that is allowed to contact the shift block 152 on its slanted face, and the portion indicated by slanting lines in the Figure is attached to the inner face of the groove in the fixing table 141. When the shaft of the hydraulic cylinder 151 is driven, the shift block 152 is allowed to contact the fixing block 153 so that the shift block 152 is shifted downward slightly by the effect of the wedge (indicated by a dotted line in the Figure). Thus, the lower face of the shift block 152 is pressed onto the inner face of the cavity 102, thereby making it possible to secure the fixing table 141 inside the cavity 102.

Moreover, the trunk main body 101 is placed on a rotary supporting base 154 made of a roller such that it is allowed to freely rotate in the diameter direction. The height of a face mill 147 on the fixing table 141 is adjusted by putting a spacer 155 between the spindle unit 146 and the saddle 143. The thickness of the spacer 155 is set to the same as the dimension of one side of the square pipe 300. The saddle 143 is allowed to shift in the diameter direction of the trunk main body 101 by rotating a handle 156 attached to the movable table 142. The movable table 142 is controlled in its shift by a servo-motor 157 and a ball screw 158 that are placed on the end portion of the fixing table 141. As the machining process proceeds, the shape of the inside of the cavity 102 is changed so that it is necessary to change the repulsive force receiver 148 and the shift block 152 of the clamping device 150 to those having appropriate shapes.

Figure 19A:
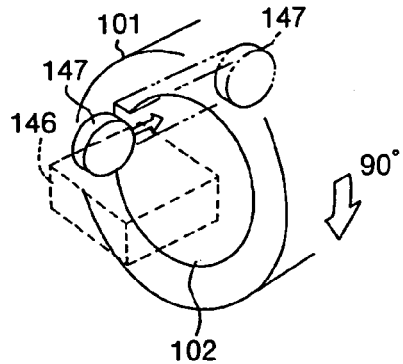
FIG. 19A to FIG. 19D are schematic explanatory views showing how the cavity is machined.

FIG. 19A to FIG. 14D are schematic explanatory views showing how the cavity is machined. First, a fixing table 141 is secured to a predetermined position inside the cavity 102 by the clamping device 150 and the repulsive force receiver 148. Next, as shown in FIG. 19A, the spindle unit 146 is shifted along the fixing table 141 at a predetermined cutting speed so that a cutting process inside the cavity 102 is carried out by the face mill 147. Upon completion of the cutting process at this position, the clamping device 150 is disengaged to release the fixing table 141.

Figure 19B:
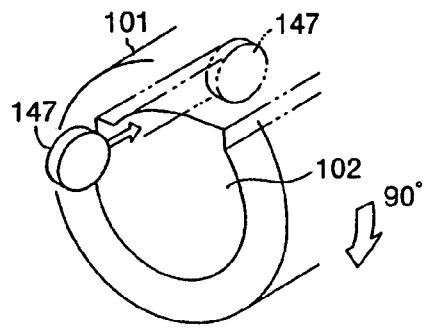

Next, as shown in FIG. 19B, the trunk main body 101 is rotated on the rotary supporting base 154 by 90 degrees so that the fixing table 141 is secured by the clamping device 150. Then, a cutting process is carried out by the face mill 147 in the same manner as described above. Thereafter, the same process as described above is further repeated twice.

Figure 19C:
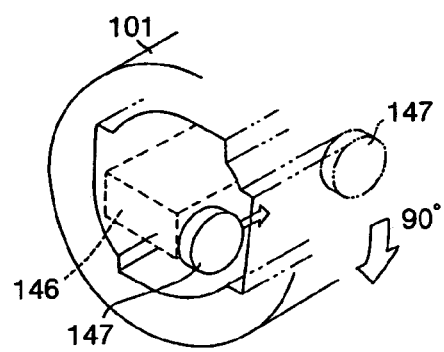
Figure 19D:
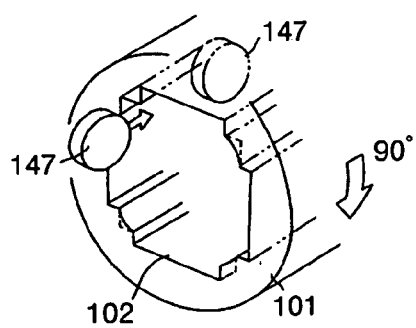

Next, the spindle unit 146 is rotated by 180 degrees so that, as shown in FIG. 19C, a cutting process inside the cavity 102 is successively carried out. In this case also, in the same manner as described above, the process is repeated while the trunk main body 101 is rotated by 90 degrees. Next, as shown in FIG. 19D, the position of the spindle unit is raised by allowing the spacer 155 to engage the spindle unit 146 as shown in FIG. 19D. Then, at this position, the face mill 147 is transported toward the axis direction so that a cutting process inside the cavity 102 is carried out. This process is repeated while the trunk main body 101 is rotated by 90 degrees so that a shape required for inserting the square pipe 300 is virtually finished. The cutting process for a portion in which the dummy pipe 133 is inserted is carried out in the same manner as shown in FIG. 19D. However, the thickness of the spacer which adjusts the height of the spindle unit 146 is set to the same as one side of the dummy pipe 133. In the above explanation, the cutting process inside the cavity 102 is carried out with the trunk main body 101 being placed laterally, however, by using a longitudinal machining device, the cutting process inside the cavity 102 may be carried out with the trunk main body 101 being placed on the rotary table longitudinally.

The spent fuel aggregates to be housed in the cask 100 include fission substances and fission products, etc., and generate radioactive rays and decay heat so that the heat removing function, shielding function and criticality prevention function of the cask 100 need to be positively maintained for a storage period (approximately, 60 years) In the cask 100 according to the first embodiment, the inside of the cavity 102 of the trunk main body 101 is subjected to a machining process so that the basket 130 constituted by the square pipes 300 is inserted therein with the outside of the basket 130 being maintained in a contact state or a nearly contact state (without a space area), therefore, it is possible to widen the heat conductive face between the square pipes 300 and the trunk main body 101. Moreover, the inner fins 107 are placed between the trunk main body 101 and the outer cylinder 105 so that heat released from the fuel rods is allowed to conduct to the trunk main body 101 through the square pipes 300 or helium gas filled therein, and released from the outer cylinder 105 mainly through the inner fins 107. As described above, the heat-removing process of decay heat is carried out efficiently so that, in the case of the same quantity of decay heat, it is possible to keep the temperature inside the cavity 102 lower than the conventional system.

Moreover, γ-rays generated by the spent fuel aggregates are shielded by the trunk main body 101, the outer cylinder 105, the lid section 109, etc. made of carbon steel or stainless steel. Furthermore, neutrons are shielded by the neutron-shielding member 106 so that radiation-related workers become less susceptible to the influence of exposure. More specifically, a designing process is carried out to obtain a shielding function such that the surface dose equivalent factor is set to not more than 2 mSv/h with the dose equivalent factor of 1 m from the surface being set to not more than 100 μSv/h. Since the square pipes 300 constituting the cells 131 use an aluminum alloy containing boron, it is possible to absorb neutrons and consequently to prevent the spent fuel aggregates from reaching the criticality.

As described above, according to the cask 100 of the third embodiment, since the inside of the cavity 102 of the trunk main body 101 is subjected to a machining process and since the square pipes 300 constituting the periphery of the basket 130 is inserted therein in a contact state, it is possible to improve the heat conductivity in the square pipes 300. Moreover, since the space area inside the cavity 102 is eliminated, it is possible to make the trunk main body 101 more compact and lighter. Even in this case, the number of the square pipes 300 to be housed is not reduced. In contrast, when the outer diameter of the trunk main body 101 is made to be the same as the cask shown in FIG. 23, since cells the number of which is increased correspondingly are prepared, it is possible to increase the number of spent fuel aggregates to be housed. More specifically, in the present cask 100, the number of spent fuel aggregates is increased to 69, and the outer diameter of the cask main body 116 is maintained to, for example, 2560 mm with the weight being reduced to 120 tons.

Moreover, since the square pipes 300 are assembled in a staggered arrangement, it is possible to make the thickness of the square pipe 300 thinner in comparison with the conventional structure. Therefore, the outer diameter of the basket can be reduced in comparison with the conventional structure, and the outer shape of the cask can be reduced in comparison with the conventional structure accordingly. Furthermore, when the thickness of the square pipe 300 is made to have a size identical to the two sheets of the conventional pipe, the rigidity becomes higher than the conventional pipe, therefore, it is possible to build the basket 130 more strongly, and consequently to improve the reliability of the cask 100.

Figure 20A:
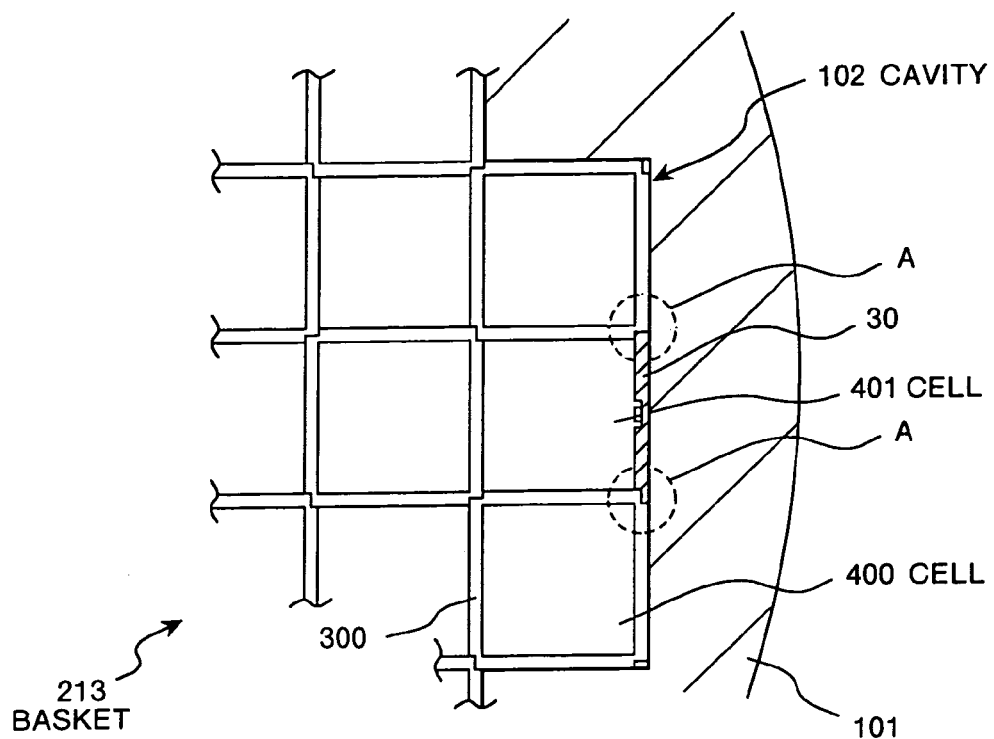
FIG. 20A and FIG. 20B are cross-sectional views in the circumferential direction that shows an example in which a basket according to the present invention is housed inside the cavity of a cask.
Figure 20B:
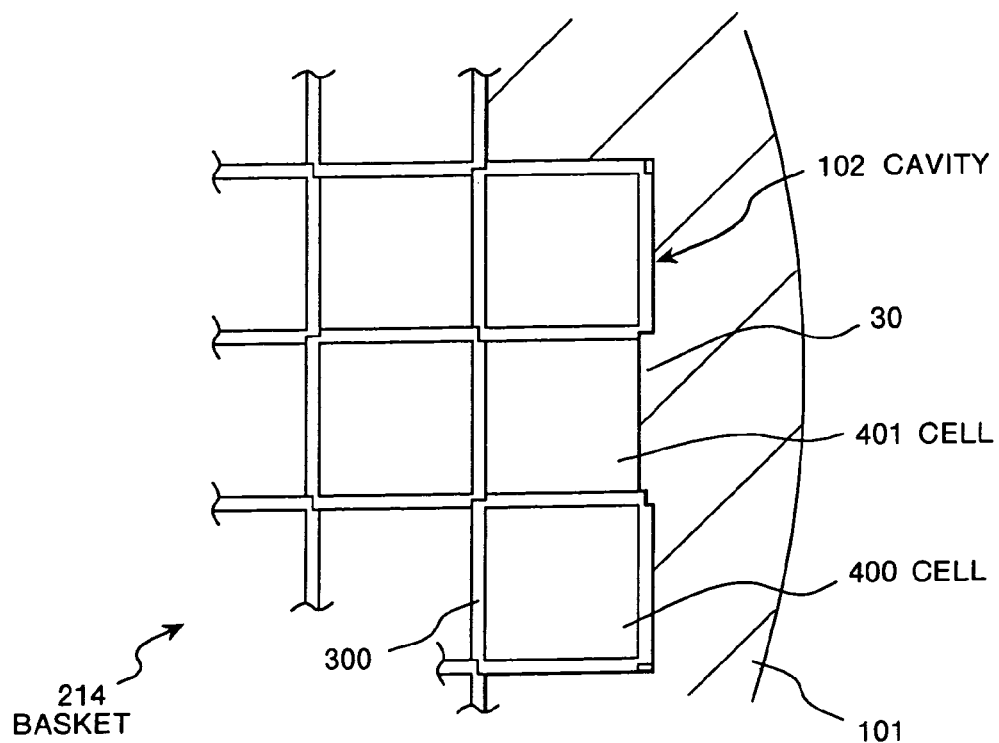

FIG. 20A and FIG. 20B are cross-sectional views in the circumferential direction that shows an example in which a basket according to the present invention is housed inside the cavity of a cask as a fourth embodiment of the present invention. Since the basket according to the present invention is constructed by combining a plurality of square pipes with each other in a staggered arrangement, there are some portions in which no side faces exist along the outer circumference of the basket. When this basket is inserted into the cavity of a cask with these portions being left as they are, gaps are formed between the inner wall of the cavity and the fuel rod aggregates, resulting in difficulties in releasing decay heat generated from the fuel rod aggregates toward the outside of the cask. Moreover, since there are portions in which no side faces exist, it is not possible to support an impact imposed at the time when the cask falls down horizontally, therefore, the basket might collapse at the time of falling of the cask.

In order to solve the above-mentioned problems, a square pipe receiver 30 constituted by side plates is placed in each of the portions where there are no side faces on the outer circumference of the basket 213 as shown in FIG. 20A, and the basket 213 is inserted into the cavity 102. A portion of the square pipe receiver 30 against which the corner portion of the square pipe 300 is butted (an area indicated by A in the Figure) is made coincident with the shape of the corner portion of the square pipe 300. The basket 213 may be inserted into the cavity 102 after the square pipe receiver 30 has been attached to the basket 213, or after the square pipe receiver 30 has been preliminarily attached to the inner wall of the cavity 102 by fastening tools such as bolts, the basket 213 may be inserted into the cavity 102. Moreover, the portion of the square pipe receiver 30 against which the corner portion of the square pipe 300 is butted (the area indicated by A in the Figure) may be fixed through welding to form a basket 213.

By using the square pipe receiver 30, decay heat from the fuel rod aggregates inserted into the cells 401 on the periphery of the basket 213 is allowed to conduct to the outer portion of the cask efficiently. Moreover, since this square pipe receiver 30 makes it possible to support an impact imposed at the time of horizontal falling of the cask, it is possible to prevent the basket 213 from collapsing at the time of falling of the cask. As shown in FIG. 20B, the inner wall of the cavity 102 may be molded into a convex shape to form a square pipe receiver 30. With this arrangement, in comparison with the case in which the square pipe receiver 30 is constituted by side plates, it is possible to eliminate the tasks to secure the side plate to the cavity inner wall, etc.

Figure 21:
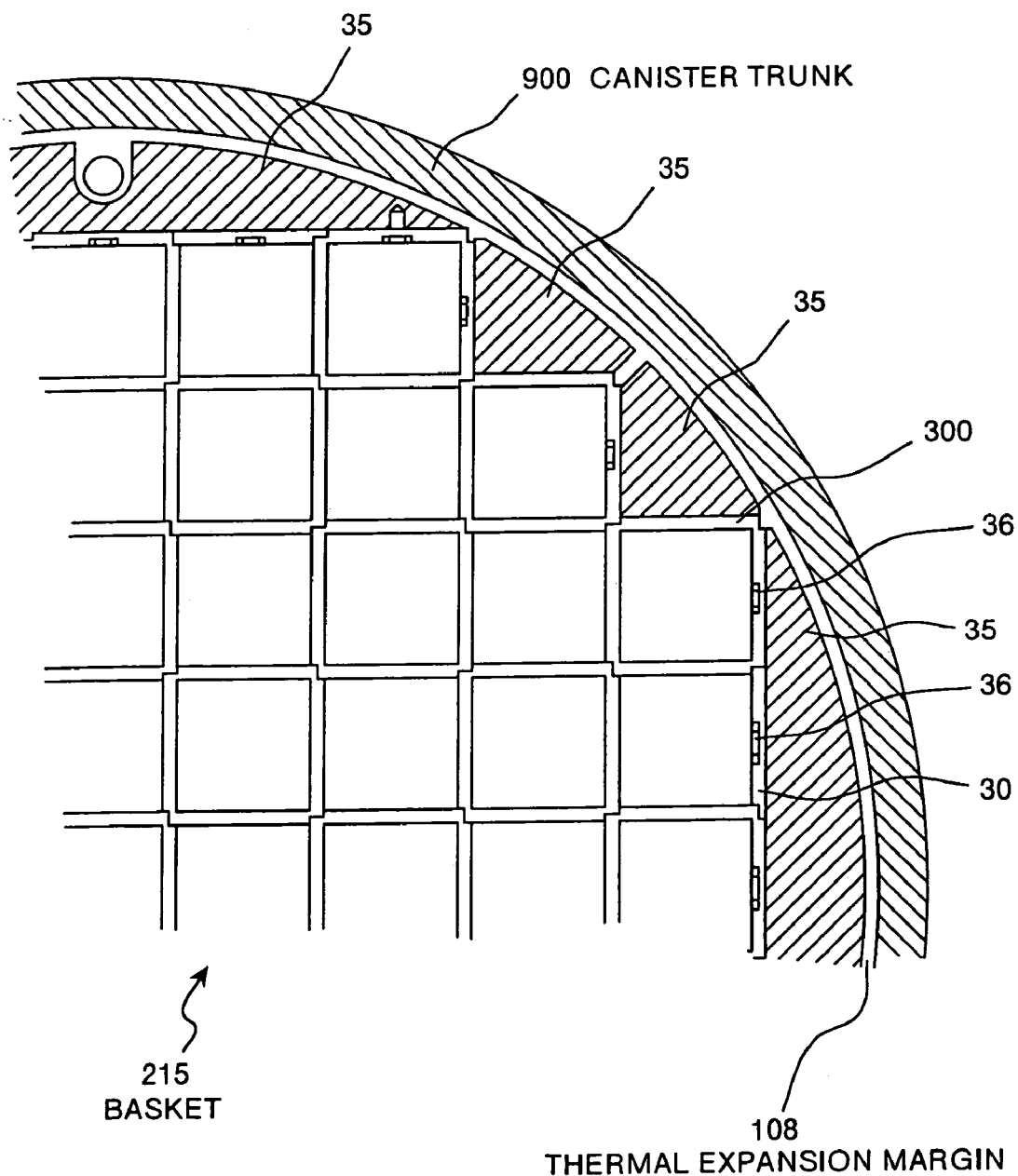
FIG. 21 is a cross-sectional view in the circumferential direction that shows an example in which a basket according to the present invention is housed in a canister.

FIG. 21 is a cross-sectional view in the circumferential direction that shows an example in which a basket according to the present invention is housed in a canister as a fifth embodiment of the present invention. Since a housing container used for the canister has a thickness thinner than the housing container used for the cask, it is difficult to mold the inner cross-sectional shape in the diameter direction in a manner so as to match the outer shape of the basket. Therefore, when a basket 215 constituted by square pipes 300 is inserted into a canister trunk 900, a spacer block 35 that matches the inner shape of the canister trunk 900 is attached onto the outer circumference of the basket 215 as shown in the Figure so that the outer shape of the basket 215 is allowed to match the inner shape of the cross-section in the radial direction of the canister trunk 900. In the case of casks, this method is efficiently applied to such a cask in which the inner face machining is minimized.

The spacer block 35 is secured to the square pipe 300 and the square pipe receiver 30 explained in a fourth embodiment by bolts 36 that are fastening members. Instead of bolts, rivets may be used as the fastening members. After the spacer block 35 has been attached to the entire periphery of the basket 215, the basket 215 is inserted into the canister trunk 900. With this arrangement, the basket according to the present invention can be applied to a canister, and since no mounting holes, etc. are required inside the cavity of the canister, no time-consuming tasks are required for the assembling operation. As explained in the fourth embodiment, a convex portion may be formed on the side of the spacer block 35 contacting the square pipe 300 as a square pipe receiver 30. Moreover, the spacer block 35 and the square pipe 300 are joined to each other through fastening members, however, instead of the fastening members, these devices may be joined to each other through welding, brazing or bonding.

Figure 22A:
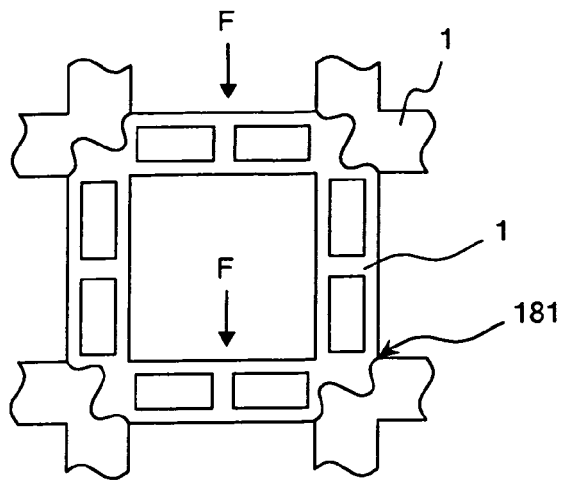
FIG. 22A to FIG. 22C are cross-sectional views in the diameter direction that shows an example of a basket according to the present invention.
Figure 22B:
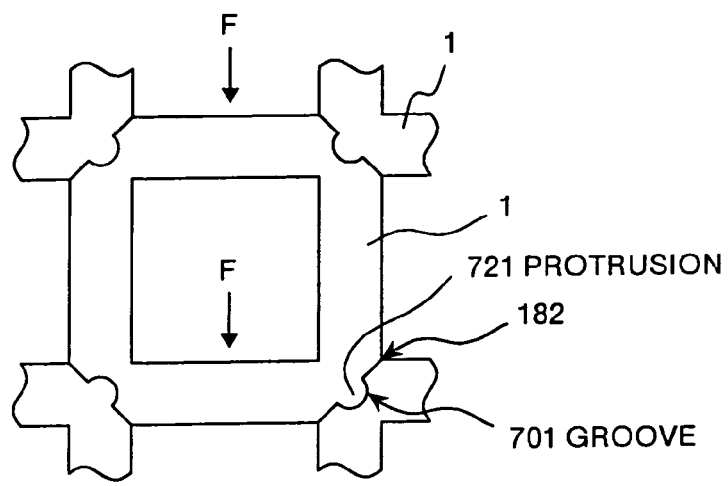
Figure 22C:
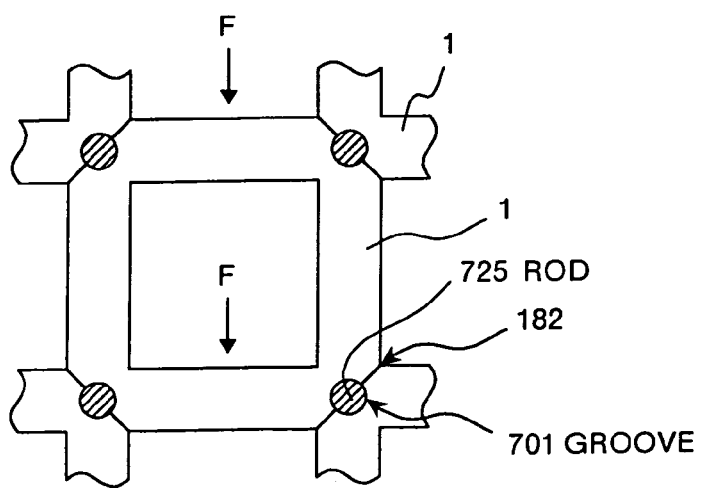

FIG. 22A to FIG. 22C are cross-sectional views in the diameter direction that shows an example of a basket according to the present invention. As shown in this Figure, the basket according to the present invention includes, for example, a structure in which the butt face 181 of each square pipe is formed by a curve and these square pipes are combined with each other in a staggered arrangement (FIG. 22A), another structure in which a protrusion 721 and a groove 701 are formed on each butt face 182 so that the protrusion is fitted to the groove (FIG. 22B) and the other structure in which a groove 701 is formed in the butt face 182 so that a rod 725 or the like is inserted to this groove so as to prevent an offset (FIG. 22C).

In the example shown in FIG. 22A, since the butt face 181 is formed by a curve, no great stress concentration is exerted on the butt face 181 even when a load F is imposed in the arrow direction. In the examples shown in FIG. 22B and FIG. 22C, the protrusion 721 and the groove 701 or the rod 725 and the groove 701 are allowed to engage each other so that it is possible to prevent an offset in the direction perpendicular to the axis direction. These are merely examples, and the combination of the square pipes is not intended to be limited by these, therefore, any combination that can be easily arrived at by one skilled in the art is included therein.

As described above, according to the spent fuel housing square pipe according to one aspect of the present invention, in comparison with a basket constituted by allowing the side faces of square pipes to contact each other, it is possible to provide a higher rigidity, and consequently to make the thickness of the side face of the square pipe thinner. Thus, it becomes possible to reduce the outer diameter dimension of the basket. Moreover, the corner portion is formed into a terrace shape, and the pipes are combined with each other by getting the step faces butted against each other, therefore, it is possible to prevent offsets in a direction perpendicular to the axis direction, and consequently to easily assemble the basket.

Moreover, it is possible to set the thickness of the corner portion to not less than one-half the thickness in the side face of the square pipe. Therefore, in comparison with the pipe molded to have a terrace shape with one step, it is possible to make the influence of stress concentration smaller.

Furthermore, movements in the direction perpendicular to the axis direction are regulated by the engaging portion formed on the step face so that the square pipes become less susceptible to offsets when they are combined with each other. Therefore, the basket is more easily combined and, if there should be an accidental fall, it is possible to maintain the shape of the basket more firmly.

According to the spent fuel housing square pipe of another aspect of the present invention even when the square pipes are combined with each other, these are less susceptible to disengagement, and the basket can be easily combined. Moreover, these square pipes are less susceptible to rattling, and, if there should be an accidental fall, it is possible to maintain the shape of the basket more firmly.

Moreover, no offset occurs even when there is a movement in a specific direction, and offsets in the square pipes are regulated with respect to movements in any direction. For this reason, the basket can be easily combined, and if there should be an accidental fall, it is possible to maintain the shape of the basket more firmly.

Furthermore, the flux trap makes it possible to the apparent thickness of the square pipe so that these square pipes can be combined with each other with wider areas on the corner portion of the respective pipes. Therefore, these square pipes are less susceptible to offsets, and can be easily combined. Moreover, it is possible to widen the heat conducting area of the joining section, and consequently to properly conduct heat generated from the spent fuel aggregates to the trunk main body of the cask.

Furthermore, it is possible to exert a function which speed-reduces and absorbs neutrons that pass through the cells housing spent fuel aggregates in a diagonal direction, in addition to the functions exerted by the above-mentioned square pipes. Moreover, this construction also makes the square pipe further lighter so that it is possible to reduce impact energy at the time of falling down.

According to the spent fuel housing square pipe of still another aspect of the present invention, the flux trap placed inside of the side face can be widened to the vicinity of the corner portion. Moreover, the flux trap placed inside of the side face makes the thickness to the outer wall virtually equal, thereby making it possible to prevent any weak portion being locally formed and consequently to alleviate the influence of stress concentration. Therefore, it becomes possible to properly maintain the performances of the square pipe and consequently to reduce degradation in the performances of the basket.

Moreover, it is possible to ensure the thickness in the vicinity of the corner portion of the square pipe and consequently to maintain a sufficient rigidity, therefore, it becomes possible to alleviate the stress concentration in the vicinity of the corner portion of the square pipe. Thus, it becomes possible to properly maintain the performances of the square pipe and consequently to reduce degradation in the performances of the basket.

Furthermore, it is possible to alleviate the stress concentration on the butt face, and consequently to reduce degradation in the performances of the basket.

Moreover, a proper contact area is ensured on the butt face in the corner portion of the square pipe, it is possible to alleviate the stress concentration on the butt face. Therefore, it is possible to reduce degradation in the performances of the basket, and consequently to enhance the reliability of the basket.

Furthermore, it is possible to increase the gross amount of $B^{10}$ that is used as a neutron absorbing member. Therefore, by using the enriched boron, in comparison with the case without using this, it is possible to obtain the same neutron absorbing ability with a thinner plate thickness, therefore, this arrangement is beneficial in reducing the weight of the basket and in minimizing the dimension of the outer diameter thereof.

According to the basket of still another aspect of the present invention, since it is possible to make the rigidity of each pipe higher in comparison with the conventional basket that is constituted by making the side faces of the square pipes contact with each other, it is possible to make the thickness of the side face of the square pipe thinner in a corresponding manner. The thickness of the side face of the square pipe is made thinner. Consequently, it is possible to make the outer diameter of the basket smaller, and in the case of the same outer diameter, it is possible to increase the number of spent fuel aggregates to be housed. Moreover, when this arrangement is applied to the housing rack in a spent fuel storing pool, etc., it is possible to house the spent fuel aggregates more closely, and also to make the system lighter as compared with the boron-stainless product, thus, it becomes possible to reduce the load to be imposed on the structure supporting the rack at the time of any abnormal state.

According to the basket of still another aspect of the present invention, offsets in the direction perpendicular to the axis direction can be regulated. Therefore, the basket is more easily combined, and if there should be an accidental fall, it is possible to maintain the shape of the basket more firmly.

According to the basket of still another aspect of the present invention, the square pipe receiver allows decay heat from the fuel rod aggregates inserted into cells located on the basket outermost circumference to conduct to the cask outer portion efficiently. Moreover, since the impact at the time of horizontal falling of the cask is supported by this square pipe receiver, it is possible to prevent collapse of the basket at the time of falling of the cask, and consequently to maintain the stability of the basket.

According to the basket of still another aspect of the present invention, since the fastener such as a bolt(s) is used, no machining process such machining which mounts holes is required in the cavity of the canister or cask, no time-consuming tasks are required in the assembling operation.

According to the spent fuel housing container of still another aspect of the present invention, in comparison with the basket formed by allowing the side faces of the square pipes to contact each other, it is possible to provide a higher rigidity, and consequently to make the thickness of the side face of the square pipe thinner. Since it is possible to reduce the outer diameter of the basket, it becomes possible to reduce the outer diameter of the spent fuel housing container as compared with the conventional basket. Consequently, it is possible to make the outer diameter of a buffer member to be attached to the spent fuel housing container smaller. Moreover, in the case of the same outer diameter of the spent fuel housing container, it is possible to increase the number of spent fuel aggregates to be housed.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A basket comprising:
a square pipe assembly having a plurality of square pipes assembled in a staggered arrangement, wherein each of the plurality of square pipes comprises:
four walls and four corners arranged so as to form a square cross section, the four walls including neutron-absorbing material and having a thickness capable of preventing spent fuel inserted therein from reaching criticality and capable of ensuring a predetermined strength at a time of falling down, wherein a cell for housing a spent fuel aggregate is formed in a space defined by walls of the square pipes;
a connecting section formed on each of the four corners, at which diagonally adjacent square pipes are contacted with each other, wherein the connecting section is formed into a terrace shape having a plurality of steps, and the steps of the terrace shape are formed to butt against the steps of adjacent square pipes when the square pipes are assembled in a staggered arrangement; and
a square pipe receiver placed between adjacent square pipes located on the outermost circumference of the square pipe assembly.

2. The basket according to claim 1, further comprising:
a fastener which fastens the outermost square pipes of the square pipe assembly; and
a spacer block formed to fit to the inner shape of the spent fuel container.

3. A spent fuel housing container comprising:
a basket according to claim 1 formed into a lattice shape as a whole by combining a plurality of square pipes with each other in a staggered arrangement and inserted to the spent fuel housing container to be fitted to cavity inner shape of the spent fuel housing container so that a spent fuel aggregate is housed inside the lattice.

4. A basket comprising:
a square pipe assembly having a plurality of square pipes assembled in a staggered arrangement, wherein each of the plurality of square pipes comprises:
four walls and four corners arranged so as to form a square cross section, the four walls including neutron-absorbing material and having a thickness capable of preventing spent fuel inserted therein from reaching criticality and capable of ensuring a predetermined strength at a time of falling down, wherein a cell for housing a spent fuel aggregate is formed in a space defined by walls of the square pipes;
a connecting section formed on each of the four corners, at which diagonally adjacent square pipes are contacted with each other, wherein the connecting section is formed into a terrace shape having at least one step, and the step of the terrace shape is formed to butt against the step of adjacent square pipes when the square pipes are assembled in a staggered arrangement; and
a square pipe receiver placed between adjacent square pipes located on the outermost circumference of the square pipe assembly.

5. A spent fuel housing container comprising:
a basket according to claim 4 formed into a lattice shape as a whole by combining a plurality of square pipes with each other in a staggered arrangement and inserted to the spent fuel housing container to be fitted to cavity inner shape of the spent fuel housing container so that a spent fuel aggregate is housed inside the lattice.

6. The spent fuel housing container according to claim 5, including portions where no side faces are present along the outer circumference of the basket, wherein said square pipe receiver is provided at the portions where there are no side faces along the outer circumference of the basket.

7. The spent fuel housing container according to claim 6, wherein said square pipe receiver is comprised by a convex portion of the spent fuel housing container.

* * * * *